US009819860B2

(12) United States Patent
Suzuki et al.

(10) Patent No.: US 9,819,860 B2
(45) Date of Patent: Nov. 14, 2017

(54) DATA PROCESSOR, DATA PROCESSING METHOD AND STORAGE MEDIUM

(71) Applicant: KABUSHIKI KAISHA TOSHIBA, Minato-ku, Tokyo (JP)

(72) Inventors: Kaoru Suzuki, Yokohama Kanagawa (JP); Yojiro Tonouchi, Inagi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/058,542

(22) Filed: Mar. 2, 2016

(65) Prior Publication Data

US 2016/0269625 A1 Sep. 15, 2016

(30) Foreign Application Priority Data

Mar. 9, 2015 (JP) .................................. 2015-045899

(51) Int. Cl.
| | |
|---|---|
| H04N 5/222 | (2006.01) |
| H04N 5/232 | (2006.01) |
| G06K 9/20 | (2006.01) |
| G06K 9/34 | (2006.01) |

(52) U.S. Cl.
CPC ....... *H04N 5/23222* (2013.01); *G06K 9/2054* (2013.01); *G06K 9/344* (2013.01); *G06K 9/348* (2013.01); *H04N 5/23229* (2013.01); *H04N 5/23258* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 5,410,611 | A | 4/1995 | Huttenlocher et al. |
| 5,557,689 | A | 9/1996 | Huttenlocher et al. |
| 5,687,253 | A | 11/1997 | Huttenlocher et al. |
| 5,949,906 | A | 9/1999 | Hontani et al. |
| 6,188,790 | B1 | 2/2001 | Yoshikawa et al. |
| 6,330,358 | B1 | 12/2001 | Nagaishi |
| 7,221,399 | B2 | 5/2007 | Fujita |

(Continued)

FOREIGN PATENT DOCUMENTS

| | | |
|---|---|---|
| JP | 05-054186 | 3/1993 |
| JP | 05-159099 | 6/1993 |

(Continued)

OTHER PUBLICATIONS

U.S. Appl. No. 15/060,151, filed Mar. 3, 2016, Suzuki et al.

(Continued)

*Primary Examiner* — Stephen Coleman
(74) *Attorney, Agent, or Firm* — Knobbe, Martens, Olson & Bear, LLP

(57) ABSTRACT

According to one embodiment, a data processor includes an image acquisition module, a degradation evaluation module, a first output module and a display module. The first output module is configured to output a first trigger for performing a process for detecting the image area when the possibility is high as a result of evaluation by the degradation evaluation module, the first output module is configured to output a command for displaying the image as it is on a display when the possibility is low as a result of the evaluation.

16 Claims, 16 Drawing Sheets

(56) References Cited

U.S. PATENT DOCUMENTS

| | | |
|---|---|---|
| 7,965,904 B2 | 6/2011 | Kobayashi |
| 8,139,862 B2 | 3/2012 | Shimodaira |
| 2003/0086615 A1 | 5/2003 | Dance et al. |
| 2006/0120629 A1 | 6/2006 | Myers et al. |
| 2009/0238494 A1 | 9/2009 | Ochi et al. |
| 2009/0309892 A1 | 12/2009 | Uehori et al. |
| 2010/0141758 A1* | 6/2010 | Kim .................. G06K 9/20 348/135 |
| 2016/0063340 A1 | 3/2016 | Suzuki et al. |
| 2016/0078631 A1 | 3/2016 | Takahashi et al. |
| 2016/0269625 A1 | 9/2016 | Suzuki et al. |

FOREIGN PATENT DOCUMENTS

| | | |
|---|---|---|
| JP | 05-189691 | 7/1993 |
| JP | 05-258118 | 10/1993 |
| JP | 05-258119 | 10/1993 |
| JP | 06-044405 | 2/1994 |
| JP | 06-245032 | 9/1994 |
| JP | 07-085215 | 3/1995 |
| JP | 07-093476 | 4/1995 |
| JP | 07-105310 | 4/1995 |
| JP | 07-152857 | 6/1995 |
| JP | 07-182459 | 7/1995 |
| JP | 08-190610 | 7/1996 |
| JP | 08-194776 | 7/1996 |
| JP | 08-315067 | 11/1996 |
| JP | 11-203404 | 7/1999 |
| JP | 11-272801 | 10/1999 |
| JP | 2000-030052 | 1/2000 |
| JP | 2000-181988 | 6/2000 |
| JP | 2001-307017 | 11/2001 |
| JP | 2001-331803 | 11/2001 |
| JP | 2002-117373 | 4/2002 |
| JP | 2002-123825 | 4/2002 |
| JP | 2002-207963 | 7/2002 |
| JP | 2005-055969 | 3/2005 |
| JP | 3677666 | 8/2005 |
| JP | 2006-172083 | 6/2006 |
| JP | 3891981 | 3/2007 |
| JP | 2008-039611 | 2/2008 |
| JP | 2008-097588 | 4/2008 |
| JP | 2008-123245 | 5/2008 |
| JP | 2008-234160 | 10/2008 |
| JP | 4164568 | 10/2008 |
| JP | 2008-287517 | 11/2008 |
| JP | 2009-230411 | 10/2009 |
| JP | 2010-231686 | 10/2010 |
| JP | 2012-221372 | 11/2012 |
| JP | 2013-246677 | 12/2013 |
| JP | 2016-045877 | 4/2016 |
| JP | 2016-062263 | 4/2016 |
| JP | 2016-167128 | 9/2016 |

OTHER PUBLICATIONS

"Word Lens", Wikipedia, the free encyclopedia, https://en.wikipedia.org/wiki/Word_Lens, Jun. 2, 2015.

Pan, Yi-Feng, et al. "A Hybrid Approach to Detect and Localize Texts in Natural Scene Images", IEEE Transactions of Image Processing, vol. 20. No. 3, Mar. 2011, pp. 800-813, 14 pages.

* cited by examiner

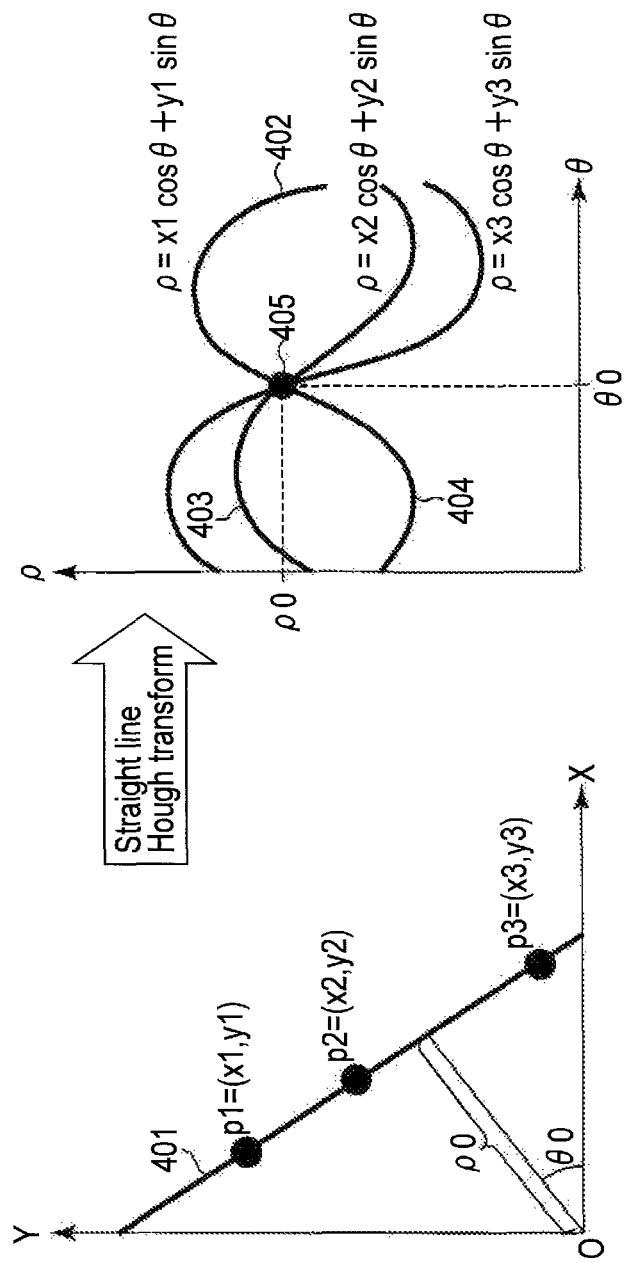
F I G. 5

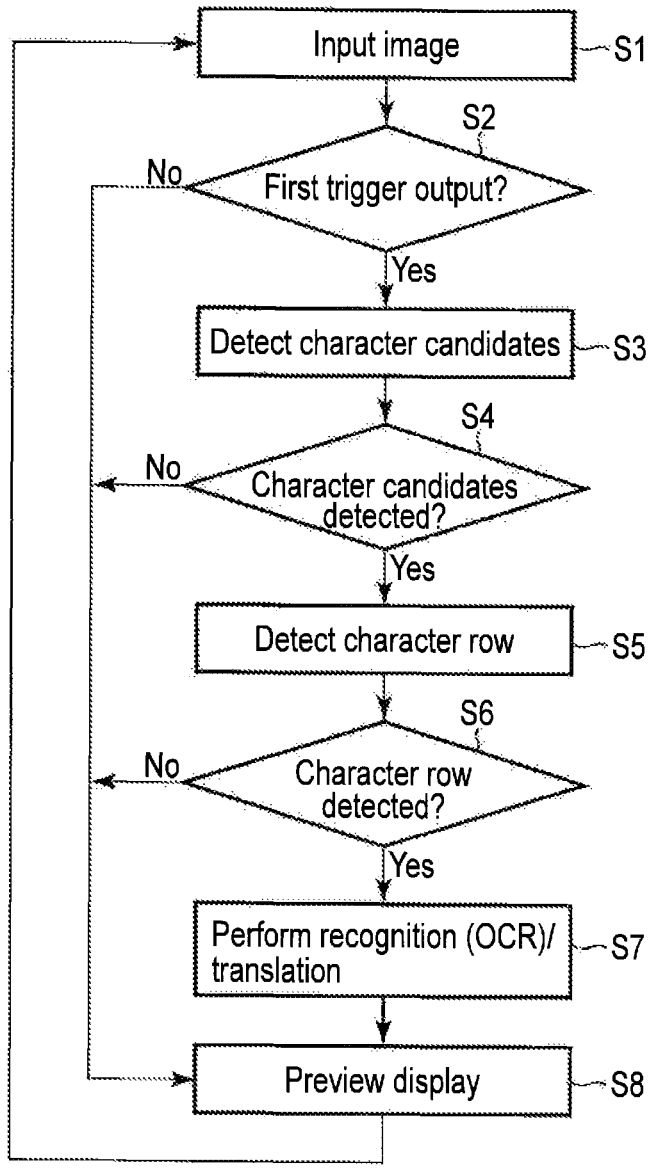
F I G. 7

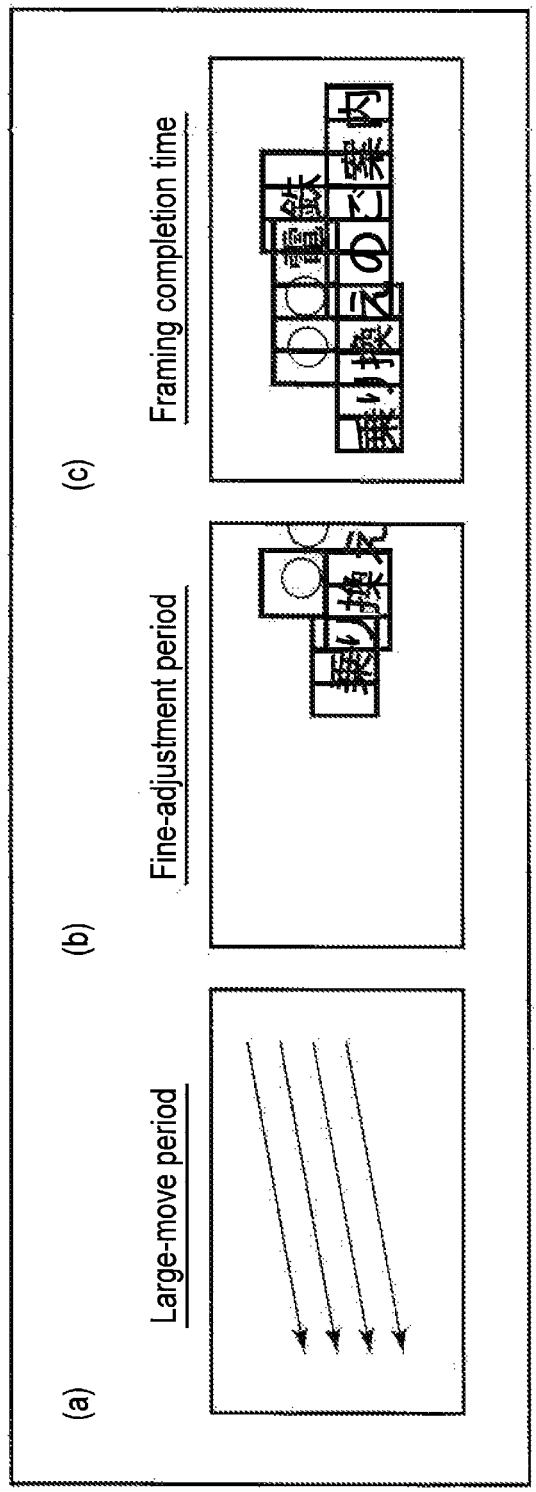
F I G. 9

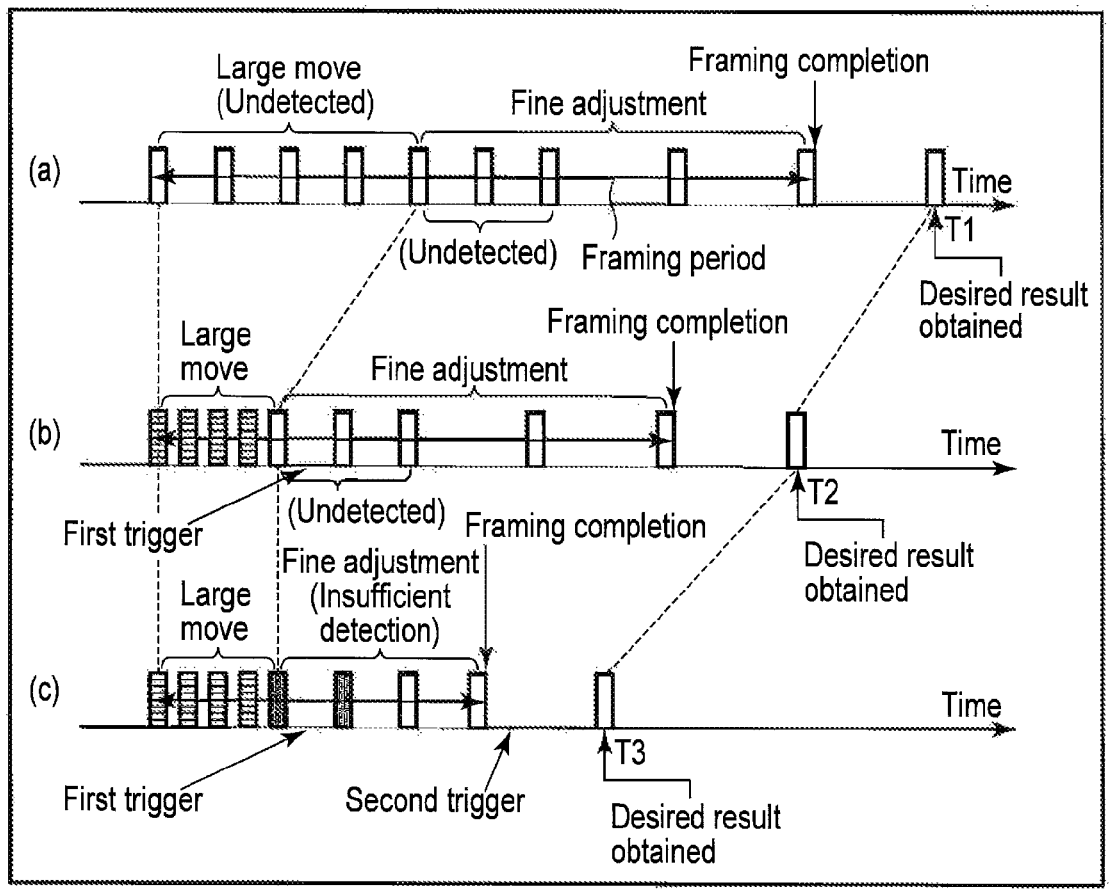
F I G. 16
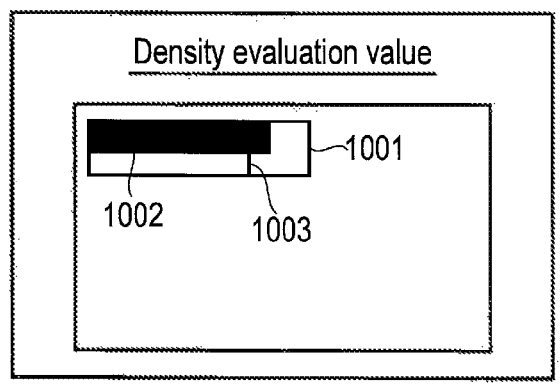
F I G. 17

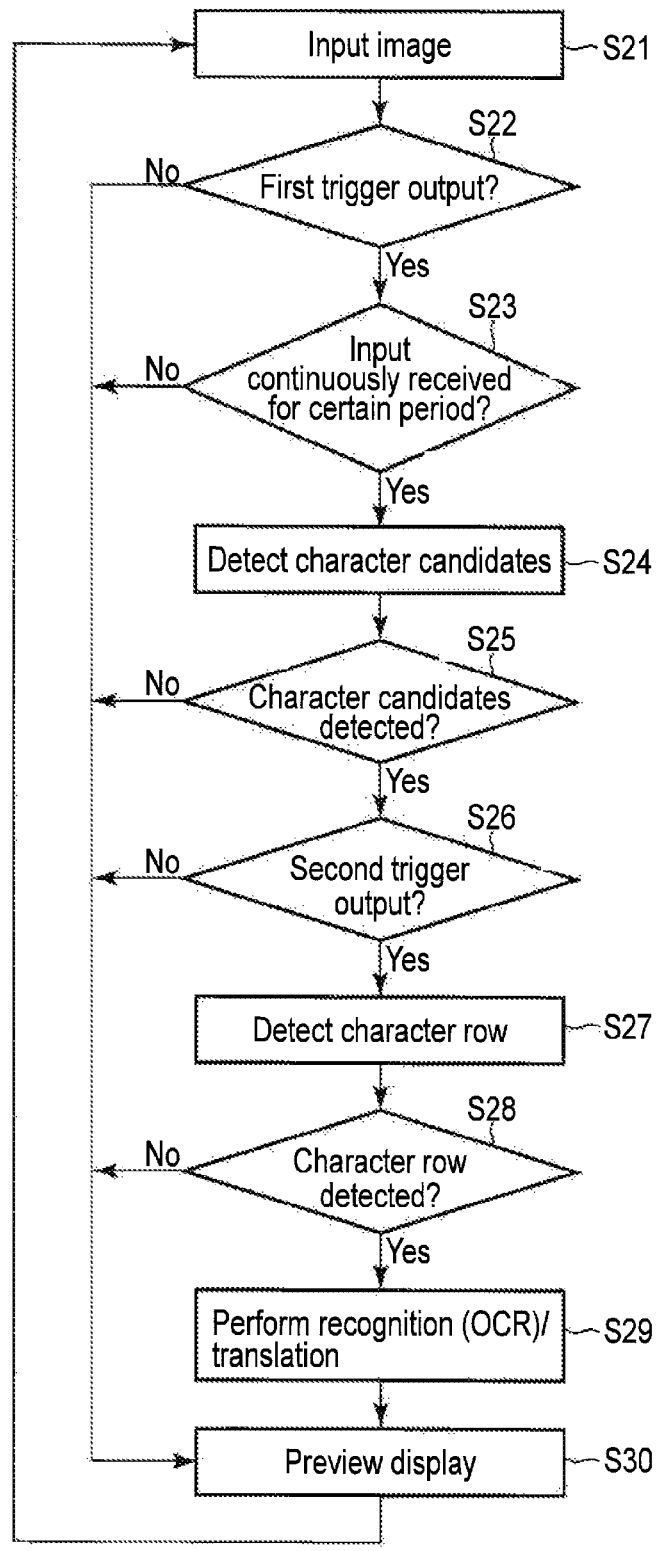
F I G. 18

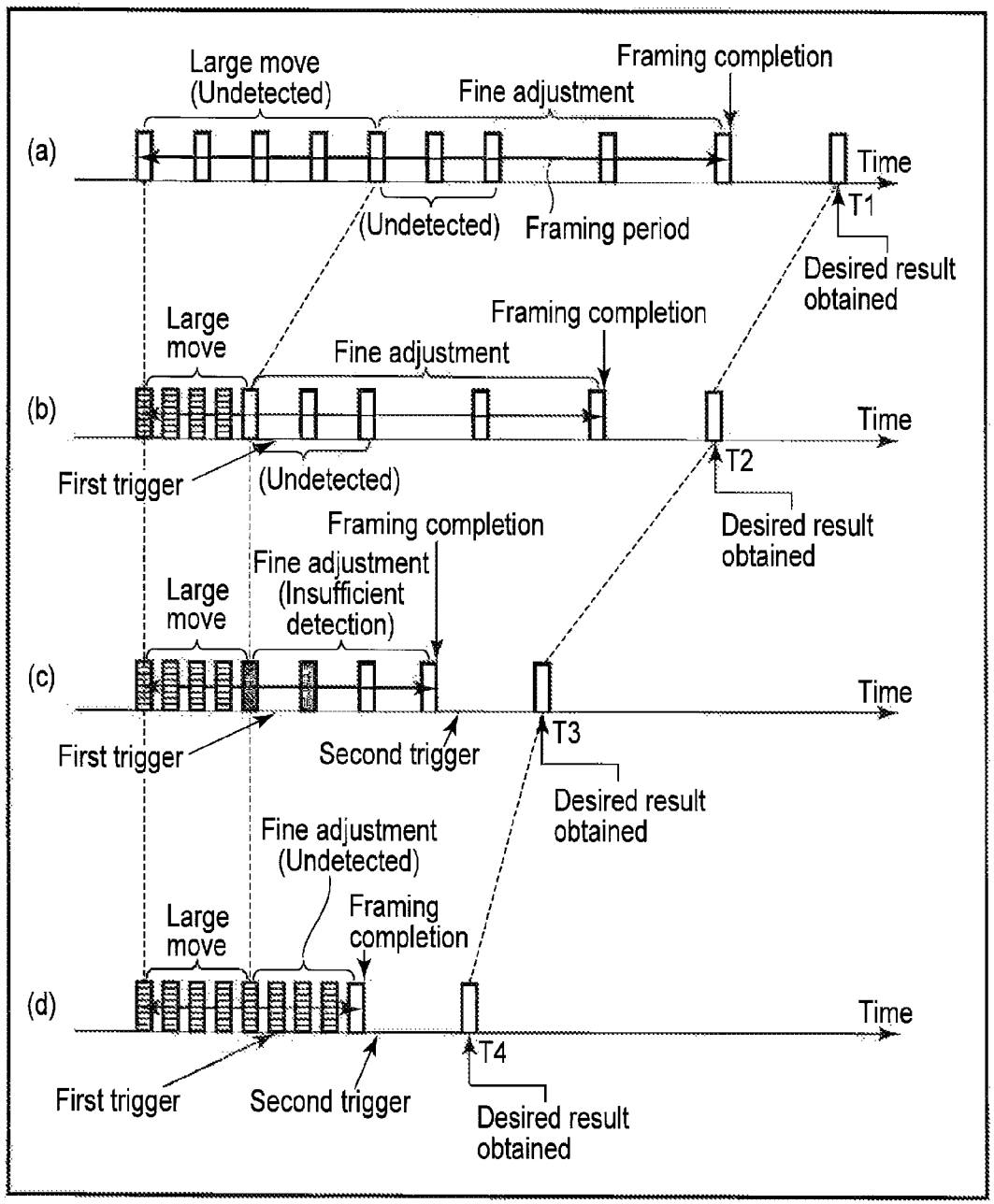
F I G. 19

DATA PROCESSOR, DATA PROCESSING METHOD AND STORAGE MEDIUM

CROSS-REFERENCE TO RELATED APPLICATIONS

This application is based upon and claims the benefit of priority from Japanese Patent Application No. 2015-045899, filed Mar. 9, 2015, the entire contents of which are incorporated herein by reference.

FIELD

Embodiments described herein relate generally to a data processor, a data processing method and a storage medium.

BACKGROUND

Recently, the following data processor has become widespread. The data processor detects characters described in an advertising display, a sign, a paper, etc., from an image captured by a camera and applies a character recognition process and a translation process to the detected characters. When using the data processor, the user needs to recognize where is currently captured by the camera through the preview screen displayed on the display, move the camera (data processor) toward the characters to be captured and set the characters so as to be within the imaging range. This process is called framing.

The framing process can be more easily performed as the time required until preview display which displays the preview screen on, the display is shorter (in other words, as the refresh rate of preview display is higher). However, at the moment, every time an image is captured by the camera, characters are detected from the image, and further, a character recognition process or a translation process is performed for the detected characters. Thus, the refresh rate becomes low, thereby creating difficulty in the above framing process.

BRIEF DESCRIPTION OF THE DRAWINGS

FIG. 5 is another pattern diagram shown for explaining the principle of straight line Hough transform.

FIG. 7 is a flowchart showing an example of the operation of the data processor according to the first embodiment.

FIG. 9 is a pattern diagram shown for explaining a framing period.

FIG. 16 is a pattern diagram shown for explaining differences between a conventional data processing method and a data processing method of the second embodiment.

FIG. 17 is a pattern diagram shown for explaining an icon for suggesting the density evaluation value.

FIG. 18 is a flowchart showing an example of the operation of a data processor according to a third embodiment.

FIG. 19 is a pattern diagram shown for explaining differences between a conventional data processing method and a data processing method of the third embodiment.

DETAILED DESCRIPTION

Embodiments will be described hereinafter with reference to the accompanying drawings.

In general, according to one embodiment, a data processor includes an image acquisition module, a degradation evaluation module, a first output module and a display module. The image acquisition module is configured to acquire an image obtained by capturing a character surface on which a character row including a plurality of characters is described. The degradation evaluation module is configured, to evaluate whether a possibility that an image area which seems to correspond to a character is detected from the image is high based on a degradation evaluation value indicating a degree of degradation of the image. The first output module is configured to output a first trigger for performing a process for detecting the image area when the possibility is high as a result of evaluation by the degradation evaluation module, the first output module is configured to output a command for displaying the image as it is on a display when the possibility is low as a result of the evaluation. The display module is configured to display, by detecting a predetermined number of image areas or more which seem to correspond to characters from the image, an image prepared by processing the image areas in accordance with the output first trigger, or display the image acquired by the image acquisition module as it is in accordance with the output command.

First Embodiment

Figure 1:
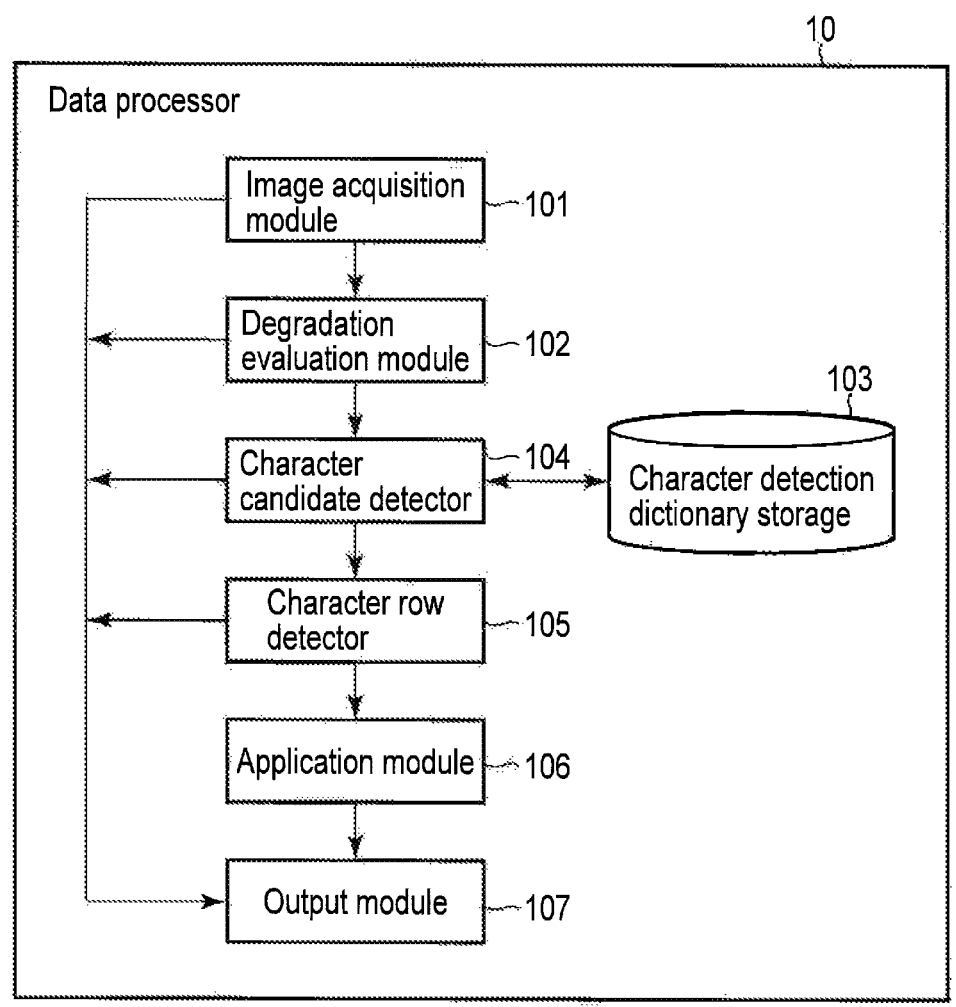
FIG. 1 is a function block diagram showing a configuration example of a data processor according to a first embodiment.

FIG. 1 is a function block diagram showing a configuration example of a data processor 10 according to a first embodiment. As shown in FIG. 1, the data processor 10 includes, for example, an, image acquisition module 101, a degradation evaluation module 102, a character detection dictionary storage 103, a character candidate detector 104, a character row detector 105, an application module 106 and an output module 107. In the present embodiment, the data processor 10 is assumed to be a tablet terminal.

The image acquisition module 101 obtains an image captured by using a camera function. In the present embodiment, characters described in an advertising display, a sign, a paper, etc., are assumed to be captured.

The degradation evaluation module 102 obtains the pose change amount of the data processor 10 at the time of capturing the image obtained by the image acquisition module 101 from an acceleration sensor, an angular velocity sensor, etc., incorporated into the data processor 10. The pose change amount is a value indicating how fast the data processor 10 (in other words, an imaging units provided in the data processor 10, such as a camera) was moved when the image was captured. There is a substantially positive correlation between the pose change amount and the degree of blurring generated in the captured image. It is highly possible that the captured image is much blurred when the pose change amount is large. If the image is much blurred, there is a high possibility that no character candidate can be detected in the character candidate detection process described later. Thus, the pose change amount is an index for determining the probability of failure in the character candidate detection process described later. When the acceleration sensor is used, the pose change amount may be the magnitude of a velocity vector obtained through temporal integration of an acceleration vector from which a gravitation component is removed. The blurring of an image is influenced by the rotational movement of the camera more than the translational movement. Therefore, the magnitude of the rotational velocity obtained by the angular velocity sensor may be regarded as an approximate pose change amount, ignoring the translational movement. The response of these sensors is quick. Thus, the pose change amount can be calculated with limited computation. In the explanation below, the pose change amount may be referred to as a degradation evaluation value since the blurring indicates the degree of degradation of the captured image.

The degradation evaluation module 102 compares the obtained degradation evaluation value with a predetermined threshold. Only when the degradation evaluation value is less than or equal to the threshold, the degradation evaluation module 102 outputs a first trigger for performing the character candidate detection process described later. When the degradation evaluation value is greater than the predetermined threshold, the degradation evaluation module 102 outputs a command for performing the preview display process explained later to the output module 107.

In the above explanation, the pose change amount measured by a sensor unit such as the acceleration sensor is used as the degradation evaluation value. However, for example, the contrast value of an image is small when the image is blurred (note that the contrast value can be obtained as the difference between the maximum brightness and the minimum brightness). Utilizing this feature, the degradation evaluation value may be obtained. Specifically, the contrast value of the image obtained by the image acquisition module 101 is calculated. Further, the contrast value is subtracted from a predetermined constant number. The value obtained in this manner may be used as the degradation evaluation value. Apart from the above, as in optical flow, the magnitude of a motion vector in the image may be directly calculated, and for example, the maximum value of the calculated magnitude of the motion vectors in the whole image may be used as the degradation evaluation value. Thus, the above processes can be performed even in a data processor which does not include a built-in acceleration sensor, etc., by directly calculating the degradation evaluation value from the image obtained by the image acquisition module 101.

In the above explanation, the first trigger is output when the degradation evaluation value is less than or equal to the predetermined threshold. However, for example, even when, the degradation evaluation value is less than or equal to the threshold, the image is blurred if the camera is not focused on the target. This blurred image has an adverse impact on the character candidate detection process described layer. Thus, the first trigger may be output only when the degradation evaluation value is less than or equal, to a threshold, and further, the camera is focused on the target.

The character detection dictionary storage 103 is a storage device configured to store a character detection dictionary used by the character candidate detector 104.

When the input of the first trigger output by the degradation evaluation module 102 is received, the character candidate detector 104 performs a character candidate detection process for detecting an image area which seems to include a character in the image obtained by the image acquisition module 101 as a character candidate (in short, an area in which a character seems to be described).

Figure 2:
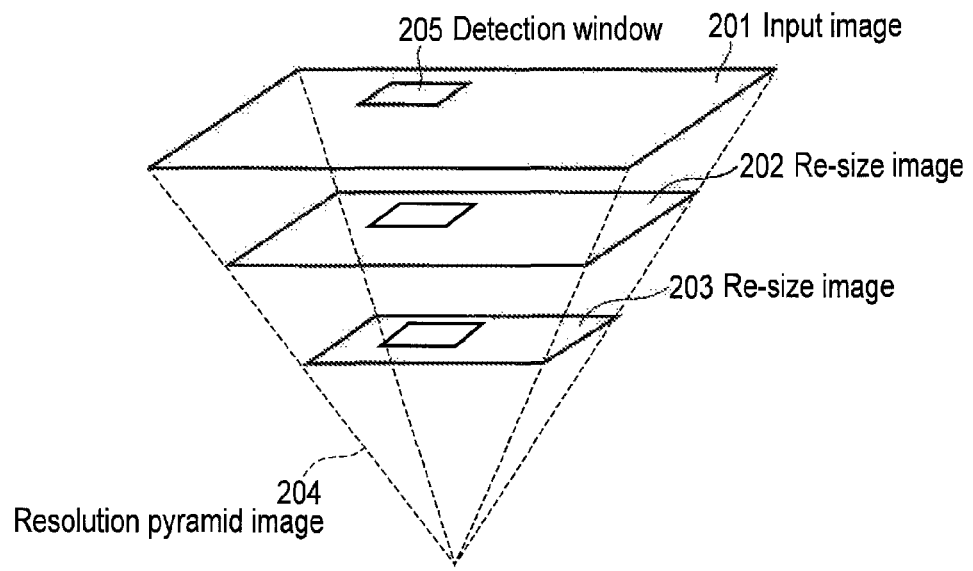
FIG. 2 is a pattern diagram shown for explaining a character candidate detection process performed by a character candidate detector according to the first embodiment.

Now, a character candidate detection process performed by, the character candidate detector 104 is explained in detail with reference to FIG. 2.

The character candidate detector 104 applies a contraction process to the image (input image) obtained by the image acquisition module 101, generates a resolution pyramid image and performs a character candidate detection process for searching for or detecting a character on the resolution pyramid image. Specifically, as shown in FIG. 2, the character candidate detector 104 contracts an input image 201 obtained by the image acquisition module 101 at a constant rate r (0<r<1) in series and generates one or more re-size images 202 and 203. The number of re-size images to be generated, in other words, the number of contraction, processes to be performed depends on the minimum size and the maximum size of the character to be detected in the specification. The size of a detection window 205 in FIG. 2 is determined in accordance with the size of the character to be detected on the input image 201 having the highest resolution. Thus, the size of the detection window 205 is the minimum size of the character to be detected in the specification. On the contracted re-size images 202 and 203 obtained by multiplying the constant rate r, the range covered by the detection window 205 having the same size is wide. Accordingly, the character to be detected becomes large. The character candidate detector 104 generates a re-size image until, the size of the character exceeds the maximum size of the character to be detected in the specification. After one or more re-size images are generated in this manner, the character candidate detector 104 generates a resolution pyramid image 204 by combining the input image 201 and the re-size images 202 and 203, as shown in FIG. 2.

After generating the resolution pyramid image 204, the character candidate detector 104 scans each of the images 201 to 203 included in the generated resolution pyramid image 204 through the detection window 205 having a predetermined size, cuts out the image included in the detection window 205 in each position and generates a plurality of partial images. The character candidate detector 104 detects a character candidate based on the generated partial images and the character detection dictionary stored in, the character detection dictionary storage 103. Specifically, the character candidate detector 104 checks each, of the partial images and the character detection dictionary, calculates the score indicating character-likeness for each of the partial images and determines whether or not each score exceeds a predetermined threshold. In this manner, it is possible to determine (evaluate) whether or not each of the partial images is an image which includes a character. In accordance with this determination result, the character candidate detector 104 provides a partial image determined as an image which includes a character with a first code indicating that the image include a character, and provides a partial image determined as an image which does not include a character (in other words, an image including something which is not a character) with a second code indicating that the image does not include a character. In this manner, the character candidate detector 104 is configured to detect an area in which a partial image having the first code is present (in other words, an area in which the detection window 205 from which a partial image having the first code is cut out is located) as an area in which a character is present.

Figure 3:
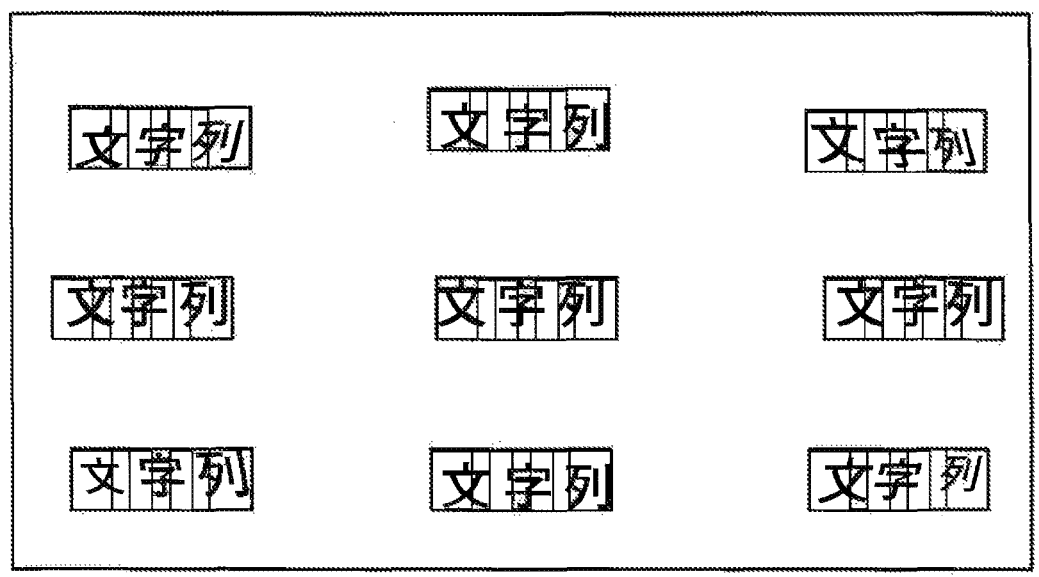
FIG. 3 is a pattern diagram shown for explaining first detection result information obtained as a result of the character candidate detection process performed by the character candidate detector according to the first embodiment.

When the number of partial images having the first code is greater than or equal to a predetermined threshold as a result of the character candidate detection process, the character candidate detector 104 outputs first detection result information indicating an area in which a character is present on the input image 201 to the character row detector 105. For example, as shown in FIG. 3, an area in which a character is present on the input image 201 is shown by a rectangular frame in the first detection result information. When the number of partial images having the first code is less than the predetermined threshold, the character candidate detector 104 outputs a command for performing the preview display process described later to the output module 107.

A well-known pattern identification method such as a subspace method or a support vector machine can be used to realize the score calculation method for evaluating the character-likeliness of a partial image included in the detection window 205. Therefore, the detailed explanation of the score calculation method is omitted in the present embodiment.

Now, this specification returns to the explanation of FIG. 1. After receiving the input of the first detection result information output by the character candidate detector 104, the character row detector 105 performs a character row detection process for detecting a character row described in the image obtained by the image acquisition module 101 based on the first detection result information. The character row detection process is a process for detecting the linear alignment of character candidates, using straight line Hough transform.

Figure 4:
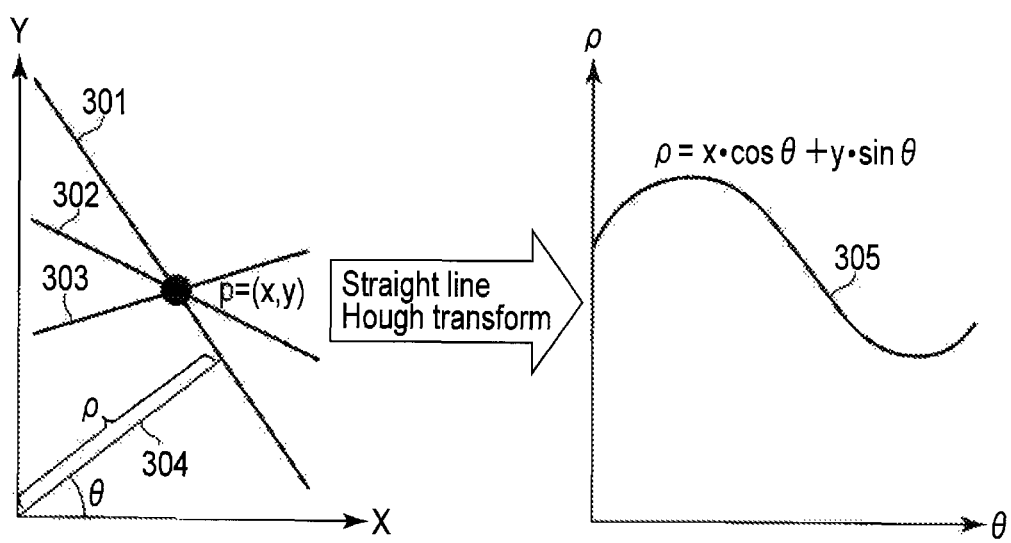
FIG. 4 is a pattern diagram shown for explaining the principle of straight line Hough transform.

The principle of straight line Hough transform is explained firstly with reference to FIG. 4.

The explanation of the principle of straight line Hough transform is begun with a discussion of a Hough curve. As exemplarily shown as straight lines 301 to 303 in FIG. 4, the number of straight lines which can pass through a point p (x, y) on the two-dimensional coordinate is countless. However, when the gradient of a perpendicular line 304 extended from the original point O to each straight line from the x-axis is defined as $\theta$, and the length, of the perpendicular line 304 is defined as $\rho$, $\theta$ and $\rho$ are uniquely determined for each straight line. The combination of $\theta$ and $\rho$ uniquely determined for each of countless straight lines which can pass through a point (x, y) is known to draw a unique locus 305 ($\rho = x \cos \theta + y \sin \theta$) in accordance with the values of (x, y) on the $\theta$-$\rho$ coordinate system. In general, the locus 305 is called a Hough curve.

Straight line Hough transform indicates that straight lines which can pass through coordinate values (x, y) are transformed to a Hough curve drawn by $\theta$, $\phi$ uniquely determined as explained above. When the straight line which passes through (x, y) inclines to left, $\theta$ is positive. When the straight line is perpendicular, $\theta$ is zero. When the straight line inclines to right, $\theta$ is negative. The domain of $\theta$ does not go beyond the range of $-\pi < \theta < -\pi$.

A Hough curve can be obtained independently with respect to each point in the x-y coordinate system. However, for example, as shown in FIG. 5, straight line 401 which passes through three points p1 to p3 in common can be obtained as a straight line determined by the coordinates ($\theta o$, $\rho o$) of point 405 which is the intersection of Hough curves 402 to 404 corresponding to points p1 to p3, respectively. The more points the straight line passes through, the more Hough curves pass through the position of $\theta$ and $\rho$ indicating the straight line. Thus, straight line Hough transform is considered to be suitable for detecting a straight line from a group of points.

When a straight line is detected from a group of points, an engineering method called Hough voting is employed. In this method, the combination of $\theta$ and $\rho$ of each Hough curve is voted in the two-dimensional Hough voting space having the $\theta$- and $\rho$-coordinate axes. This voting suggests the combination of $\theta$ and $\rho$ through which a large number of Hough curves pass, in other words, the presence of a straight line which passes through a large number of points, in a position which gained a large number of votes in the Hough voting space. In general, a two dimensional array (Hough voting space) is prepared such that the array has the size of a necessary search range for $\theta$ and $\rho$. Further, the number of votes obtained is reset to zero. Subsequently, a Hough curve is obtained for each point by the above Hough transform. Only the value of one is added to, on the array, a position through which the Hough curve passes. This method is called Hough voting in general. After the above Hough voting is performed for all of the points, the following facts are revealed. No straight line is present in a position which did not gain any vote (in other words, a position through which no Hough curve passes). A straight line which passes through only one point is present in a position which gained one vote (in other words, a position through which only one Hough curve passes). A straight line which passes through two points is present in a position which gained two votes (in other words, a position through which two Hough curves pass). Further, a straight line which passes through n points is present in a position which gained n votes (in other words, a position through which n Hough curves pass). In short, a straight line which passes through two or more points on the x-y coordinate system appears as a position which gained two or more votes in the Hough voting space.

If the resolution in the Hough voting space can be made infinite, as described above, only a point on a locus gains votes whose number is equal to the number of loci which pass through the point. However, the actual Hough voting space is quantized with an appropriate resolution with respect to $\theta$ and $\rho$. Thus, in the distribution of the number of votes obtained, the circumference of the intersection position of a plurality of loci also shows a large number of votes obtained. Therefore, the intersection position of loci is obtained by looking for the position having the local maximum value in the distribution of the number of votes obtained in the Hough, voting space.

Figure 6:
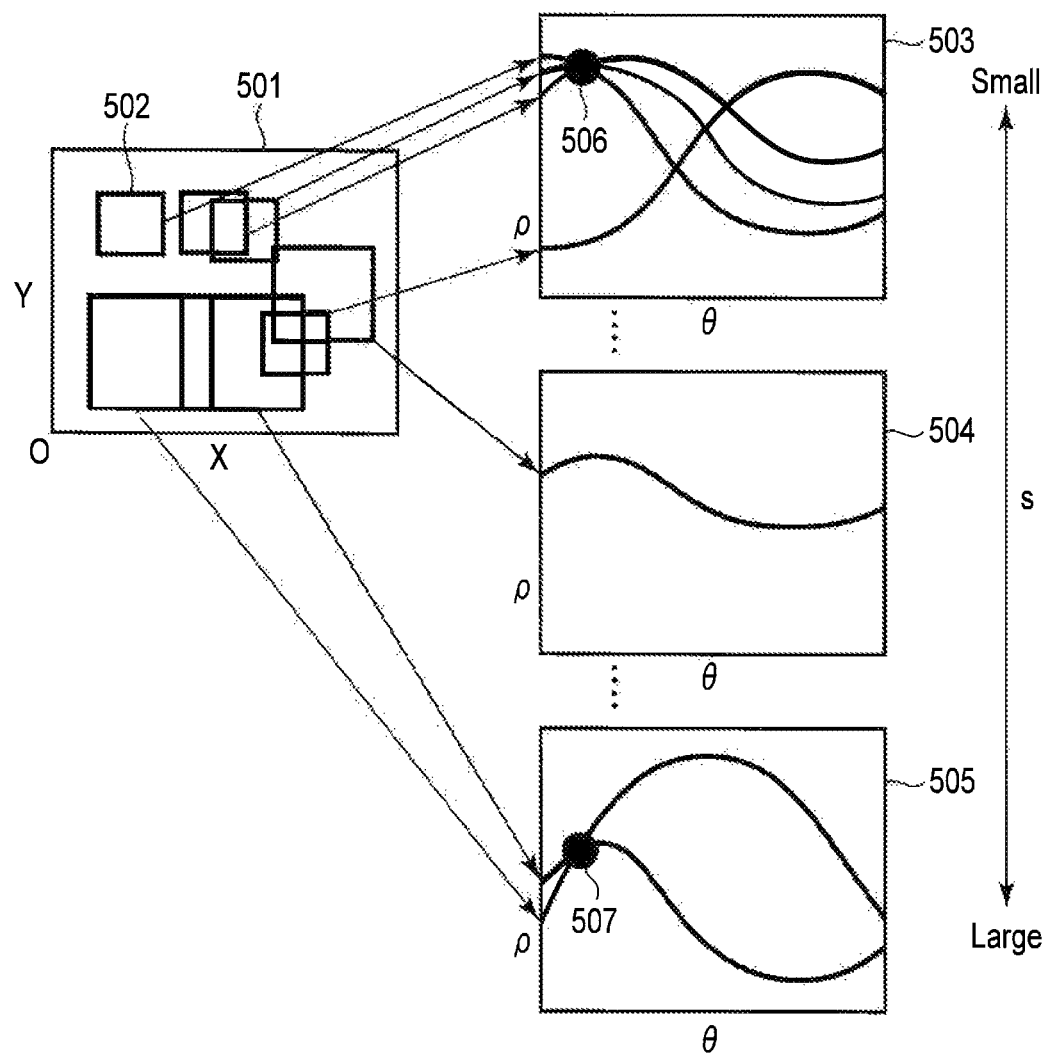
FIG. 6 is a pattern diagram shown for explaining Hough voting.

With reference to FIG. 6, this specification explains a character row detection process using the above straight line Hough transform and Hough, voting. Here, the plane of the input image is assumed to be the plane of coordinates 501 in which the horizontal axis is x and the vertical axis is y.

When the central coordinates on the image of a character candidate 502 are (x, y), an infinite number of straight lines pass through this point. These straight lines certainly satisfy the above equation for straight line Hough transform defined as: $\rho = x \cos \theta + y \sin \theta$. As described above, $\rho$ and $\theta$ indicate the length of the perpendicular line extended, from the original point O to each straight line on the x-y coordinate system and the gradient of the perpendicular line from the x-axis, respectively. The values of $(\theta, \rho)$ satisfied by straight lines which pass through a point (x, y) form a Hough curve on the $\theta$-$\rho$ coordinate system. A straight line which passes through two different points can be expressed by the combination of $(\theta, \rho)$ which is the intersection point of the Hough curves of the two points. The character row detector 105 obtains the Hough curves of character candidates detected by the character candidate detector 104 from the central points of the character candidates. When the character row detector 105 discovers the combination of $(\theta, \rho)$ on which a large number of Hough curves intersect, the character row detector 105 detects the presence of a straight line in which a large number of character candidates are linearly aligned; in short, the presence of a character row.

To discover the combination of $(\theta, \rho)$ on which a large number of Hough curves intersect, the character row detector 105 votes a Hough curve calculated from the central coordinates of a character candidate in the Hough voting space. In the Hough voting space, as shown in FIG. 6, the vertical axis is $\rho$, and the horizontal axis is $\theta$. Further, a plurality of Hough voting spaces 503 to 505 are prepared in accordance with the size s of the character candidate 502, as shown in FIG. 6. When, the character candidate 502 is small, the character candidate 502 is voted in Hough voting space 503 for a small size s. When the character candidate 502 is large, the character candidate 502 is voted in a Hough voting space 505 for a large size s. The character row detector 105 detects the straight line defined by a local maximum position $(\theta, \rho)$ which gained votes more than or equal to a predetermined threshold in each Hough voting space. The character row detector 105 detects the assembly of character candidates which voted the straight line as a character row. When the character row detector 105 detects a plurality of straight lines defined by local maximum positions $(\theta, \rho)$ which gained votes more than or equal to a predetermined threshold on one Hough curve, the character row detector 105 detects the assembly of character candidates which voted the straight line having the highest number of votes obtained as a character row. For example, when the predetermined threshold is two, a local maximum position 506 which gained three votes is detected as a character row by the character row detector 105 in Hough voting space 503 in FIG. 6, beating out the local maximum positions which gained two votes. In Hough voting space 505 in FIG. 6, a local maximum position 507 which gained two votes is detected as only one character row by the character row detector 105. Thus, two straight lines corresponding to local maximum positions 506 and 507, respectively, are detected from the input image. After the straight line are detected, the character row detector 105 extracts character candidates which voted each straight line and detects a character row as the area covered by the candidates.

When local maximum positions detected in different Hough voting spaces adjacent to each other in the size s are close to each other within a predetermined distance, the character row detector 105 determines that the same character row is detected separately, and detects these local maximum positions as one character row from the assembly of character candidates which voted the local maximum positions.

When one or more character rows are detected as a result of the character row detection process, the character row detector 105 outputs second detection result information indicating the area in which the one or more character rows are present to the application module 106. When no character row is detected as a result of the character row detection process, the character row detector 105 outputs a command for performing the preview display process described later to the output module 107.

Now this specification returns to the explanation of FIG. 1. The application module 106 performs a process unique to an application installed in advance, using the second detection result information output by the character row detector 105. For example, when an application configured to perform a character recognition process (for example, an application having an OCR function) is installed in advance, the application module 106 extracts the image pattern of the area in which a character row is present shown by the second detection result information. The application module 106 applies a character recognition process to the extracted image pattern of the character row and obtains a character code string corresponding to the character row in the area.

When the characters in an image are recognized by an OCR function, etc., the application module 106 is configured to search for information related to the obtained character code string. Specifically, the application module 106 is configured to search for information such as the price or specification from a product name, obtain, from the name of a place or a noted place, map information to get to the place, and translate a language into another language. The process result information showing the result of the process performed by the application module 106 is output to the output module 107.

The output module 107 performs a preview display process for superimposing the process result information output by the application module 106 on the image obtained by the image acquisition module 101 and displaying the image on the display of the data processor 10. When the output module 107 receives the input of a command, for performing a preview display process from each module different from the application module 106, the output module 107 performs a preview display process for at least displaying the input image on the display as it is in accordance with the command.

Now, this specification explains an example of the operation of the data processor 10 structured in the following manner with reference to the flowchart of FIG. 7.

First, the image acquisition module 101 obtains (acquires) an image which is captured by a camera function (step S1). Subsequently, the degradation evaluation module 102 obtains, from the acceleration sensor, etc., incorporated into the data processor 10, the degradation evaluation value at the time of capturing the image obtained by the image acquisition module 101. The degradation evaluation module 102 determines (evaluates) whether or not the obtained degradation evaluation value is less than or equal to a predetermined threshold (step S2). When the degradation evaluation value exceeds the threshold as a result of the determination process in step S2 (NO in step S2), the process proceeds to step S8 for preview-displaying the obtained image as it is as described later.

When the degradation evaluation value is less than or equal to the threshold as a result of the determination process in step S2 (YES in step S2), the degradation evaluation module 102 outputs the first trigger for performing a character candidate detection process to the character candidate detector 104. After receiving the input of the first trigger output by the degradation evaluation module 102, the character candidate detector 104 applies a character candidate detection process to the image obtained by the image acquisition module 101 (step S3).

Subsequently, the character candidate detector 104 determines whether or not a predetermined number of character candidates or more are detected as a result of the character candidate detection process in step S3 (step S4). When a predetermined number of character candidates or more are not detected as a result of the determination process in step S4 (NO in step S4), the process proceeds to step S8 for preview-displaying the obtained image as it is as described later.

When a predetermined number of character candidates or more are detected as a result of the determination process in step S4 (YES in step S4), the character row detector 105 applies a character row detection process to the image obtained by the image acquisition module 101 based on the first detection result information obtained as a result of the character candidate detection process in step S3 (step S5).

Subsequently, the character row detector 105 determines whether or not one or more character rows are detected as a result of the character row detection process in step S5 (step S6). When no character row is detected as a result of the determination process in step S6 (NO in step S6), the process proceeds to step S8 for preview-displaying the obtained image as it is as described later.

When one or more character rows are detected as a result of the determination process in step S6 (YES in step S6), the character row detector 105 outputs the second detection result information obtained as a result of the character row detection process in step S5 to the application module 106. The application module 106 performs a process (for example, a character recognition process or a translation process) unique to an application installed in advance based on, the second detection, result information output by the character row detector 105, and outputs the process result information showing the process result to the output module 107 (step S7).

After receiving the input of the process result information output by the application module 106, the output module 107 performs a preview display process for superimposing the process result information on the image obtained by the image acquisition module 101 and displaying the image on, the display. When the input of a command for performing a preview display process is received from each module different from the application module 106, the output module 107 displays the image obtained by the image acquisition module 101 on the display as it is (step S8) and terminates the process.

Figure 8:
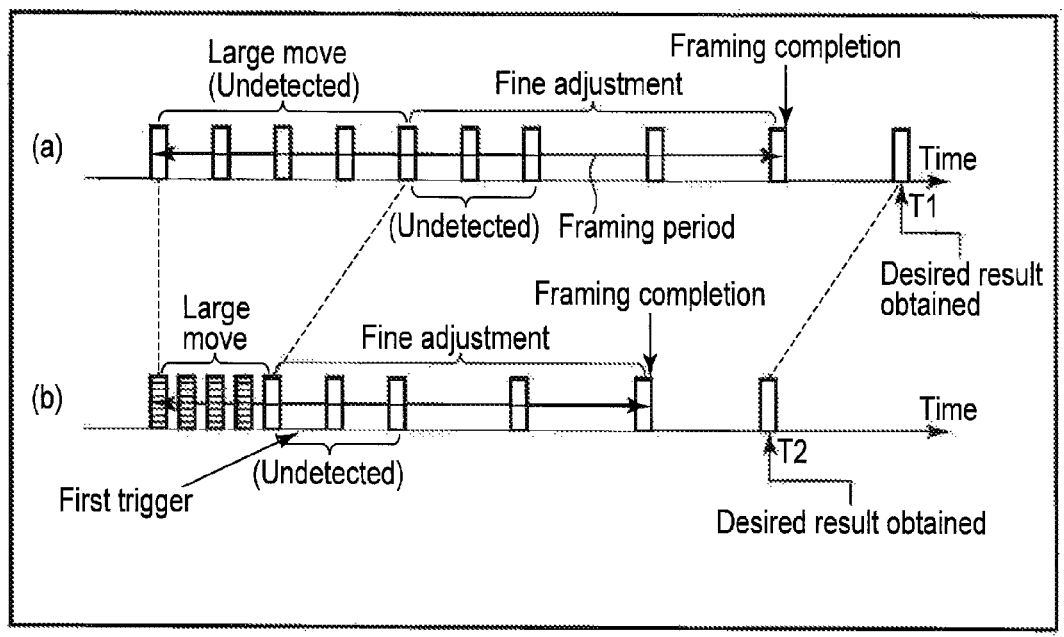
FIG. 8 is a pattern diagram shown for explaining differences between a conventional data processing method and a data processing method of the first embodiment.

Now, this specification explains differences between the conventional data processing method and the data processing method of the present embodiment with reference to FIG. 8. Mainly, this specification explains differences between the methods in terms of a framing period and a refresh rate.

A framing period refers to a period from when the user starts moving the data processor 10 toward the character string to be captured to when the user obtains an image which leads to the acquisition of a desired character recognition, result or translation result for the framing through, for example, display output (in short, if the user processes the image, a desired result will be obtained). A framing period can be divided into three major stages. The first stage is a period (hereinafter, referred to as a large-move period) in which the data processor 10 is moved toward the target character string on a large scale as shown in FIG. 9(a). In the large move period, the image is blurred because of the large move of the data processor 10. Therefore, even if a character candidate detection process is performed, no character candidate is detected, as shown in FIG. 9(a). The second stage is a period (hereinafter, referred to as a fine-adjustment period) in which the speed of the data processor 10 which was moved in a large scale is reduced to set the target character string within the imaging range, as shown in FIG. 9(b). In the first half of the fine-adjustment period, the data processor 10 has just started slowing down. Thus, the image is blurred. A character candidate may be detected or may not be detected depending on the case. In the second half of the fine-adjustment period, the speed of the data processor 10 is sufficiently reduced. Thus, the image is less blurred. The detection of a character candidate is started, as shown in FIG. 9(b). The third stage is the time (hereinafter, referred to as a framing completion time) when the target character string is completely set within the imaging range, as shown in FIG. 9(c). The user can obtain a desired result ideally immediately after the framing completion time.

In consideration of the above description, FIG. 8(a) and FIG. 8(b) are explained. These figures assume a state in which the data processing method ideally functions. The result desired by the user can be safely obtained from the image which is obtained when the framing is completed.

FIG. 8(a) is a pattern diagram showing the relationship between the process executed until the acquisition of a desired result and the time required for the process when the conventional data processing method is employed. In the conventional data processing method, a character candidate detection process is executed every time an image is obtained. As described above, the image is blurred in the whole large-move period and the first half of the fine-adjustment period. Therefore, even if a character candidate detection process is performed, no character candidate is detected (or a character candidate is difficult to be detected). Thus, the obtained image is preview-displayed, as it is. In the whole large-move period and, the first half of the fine-adjustment period, the refresh rate (in other words, the time required until the re-execution of a similar process) is equivalent to the sum of the times required for a process for obtaining an image, a character candidate detection process and a preview display process. In the second half of the fine-adjustment period, as described above, the image is less blurred. Thus, the detection of a character candidate is started. In the second half of the fine-adjustment period, the refresh rate is equivalent to the sum of the times required for a process for obtaining an image, a character candidate detection process, a character row detection process, a recognition (OCR)/translation process and a preview display process. Thus, the time required to obtain a desired result is considered to be time $T_1$, as shown in FIG. 8(a).

FIG. 8(b) is a pattern diagram showing the relationship between the process executed until the acquisition of a desired result and the time required, for the process when only the mechanism configured to output the first trigger is provided. In this case, at least in the whole large-move period, the image is largely blurred; in other words, the degradation evaluation value is always greater than a predetermined threshold. Thus, the first trigger for performing a character candidate detection process is not output. In the whole large-move period, the refresh rate is equivalent to the sum of the times required only for a process for obtaining an image and a preview display process. As shown in FIG. 8(b), the time required to obtain a desired result can be largely reduced in comparison with FIG. 8(a). Specifically, time $T_1$ required to obtain a desired result in the conventional method can be reduced to time $T_2$, as shown in FIG. 8(b).

Figure 10:
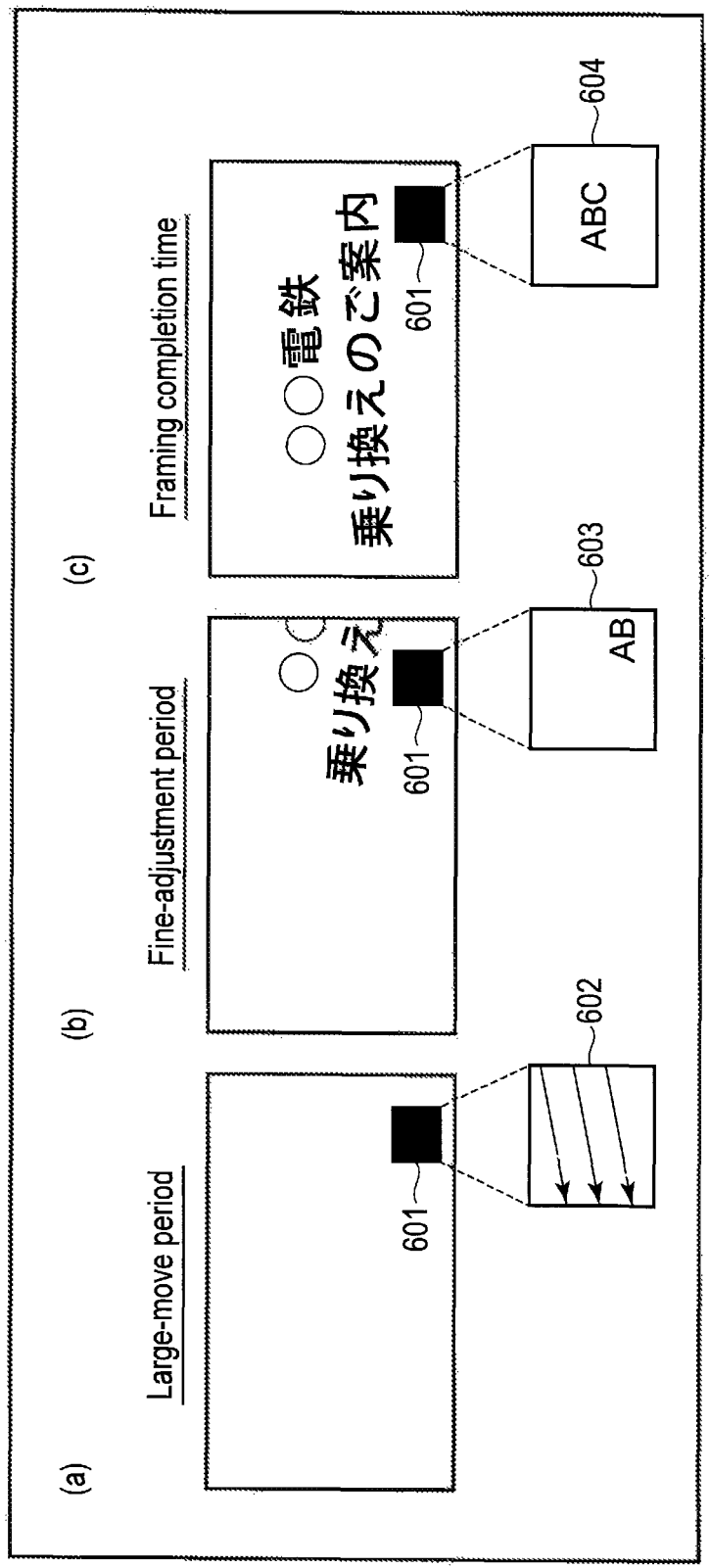
FIG. 10 is a pattern diagram shown for explaining various icons for suggesting the framing state.

Now, this specification explains various icons for suggesting the framing state with reference to FIG. 10. As explained in FIG. 8, three periods are present from the start of a framing period to the completion of the framing period. Specifically, the three periods are (1) a large-move period, (2) a fine-adjustment period and (3) a framing completion time. When the user is notified of the difference in the three periods through preview display by the output module 107, the user can accurately recognize the framing state. Thereby, framing can be performed more accurately.

FIG. 10(a) is a pattern diagram showing an example of an icon for suggesting to the user that the current period is the large-move period (1). When the current period, is equivalent to, of the three periods (1) to (3), the large-move period (1) in FIG. 8, icon 602 for suggesting that the current period, is the large-move period is displayed on an icon display area 601 on the display of the data processor 10. In FIG. 10(a), the arrow icon 602 indicating that the move of the user of the data processor 10, in other words, the move of the data processor 10 is large is displayed as the icon for suggesting that the current period is the large-move period. However, the design of the icon for suggesting the large-move period is not limited to this example. For example, the character string "large-move period" may be merely displayed on the display. Note that the icon is preferably designed such that the user can easily recognize that the current period is the large-move period.

FIG. 10(b) is a pattern diagram showing an example of an icon for suggesting to the user that the current period is the fine-adjustment period (2). When the current period is equivalent to, of the three periods (1) to (3), the fine-adjustment period (2) in FIG. 8, icon 603 which suggests that the current period is the fine-adjustment period is displayed in the icon display area 601 on the display of the data processor 10. In FIG. 10(b), icon 603 which indicates that the target is entering the imaging range of the data processor 10 is displayed as the icon for suggesting that the current period is the fine-adjustment period. However, the design of the icon for suggesting the fine-adjustment period is not limited to this example. For example, the character string "fine-adjustment period" may be merely displayed on the display. Note that the icon is preferably designed such that the user can easily recognize that the current period is the fine-adjustment period.

FIG. 10(c) is a pattern diagram showing an example of an icon for suggesting to the user that the current period is the framing completion time (3). When the current period is equivalent to, of the three periods (1) to (3), the framing completion time (3) in FIG. 8, icon 604 which suggests that the current period is the framing completion time is displayed in the icon display area 601 on the display of the data processor 10. In FIG. 10(c), icon 604 which indicates that the target finished entering the imaging range of the data processor 10 (in other words, the target is set within the imaging range) is displayed as the icon for suggesting the framing completion time. However, the design of the icon for suggesting the framing completion time is not limited to the above example. For example, the character string "framing completion time" may be merely displayed on the display. Note that the icon is preferably designed such that the user can easily recognize that the current period is the framing completion time.

In FIG. 10, the icon suggesting each of the three periods (1) to (3) is displayed. However, for example, the sound corresponding to each of the three periods may be output by the output module 107.

Figure 11:
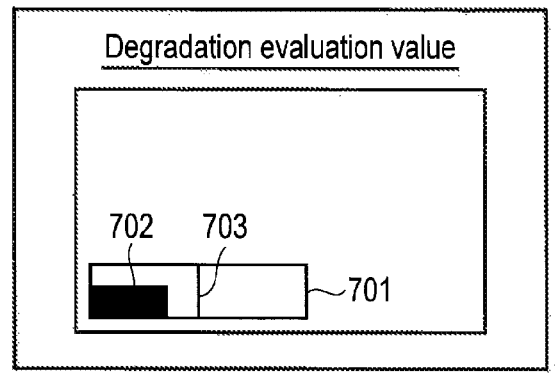
FIG. 11 is a pattern diagram shown for explaining an icon for suggesting a degradation evaluation value.

In addition to the suggestion of the three periods (1) to (3), it is possible to suggest the degradation evaluation value to the user, using a graph superimposed on the preview display by the output module 107. Further, it is possible to suggest the position of a character candidate detected by the character candidate detector 104 or a character row detected by the character row detector 105 to the user, using a frame, etc. With reference to FIG. 11, this specification explains a graph icon for suggesting the degradation evaluation value.

FIG. 11 is a pattern diagram showing an example of a graph icon for suggesting the degradation evaluation value. The graph (here, the bar graph) showing the degradation evaluation value is displayed in a graph display area 701 on the display of the data processor 10. FIG. 11 shows a graph 702 indicating the degradation evaluation value calculated by the degradation evaluation module 102. FIG. 11 also shows a line 703 indicating a predetermined, threshold in the degradation evaluation module 102. According to FIG. 11, the user can visually recognize that the degradation evaluation value calculated by the degradation evaluation module 102 is less than the predetermined threshold (in other words, the first trigger is output). When the degradation evaluation value is less than the predetermined threshold (in other words, the first trigger is output), the user can more easily recognize that the first, trigger is output by differentiating the color or brightness of the graph from that of the graph which is displayed when the degradation evaluation value exceeds the threshold.

As shown in FIG. 11, the user is notified of the degradation evaluation value. This notification enables the user to more specifically predict, when a desired result is not obtained from detection, recognition or translation of a character row, the cause of this failure; for example, the user can predict that the cause is the large-move period, or the failure of detection of a character candidate because the target character is too far or the inclination of the character is too steep.

In the above description, the degradation evaluation module 102 does not perform the determination process of step S2 in FIG. 7 after the start of the process subsequent to the character candidate detection (steps S3 to S7 in FIG. 7). However, in consideration of the possibility that the user restarts the framing along the way, the degradation evaluation module 102 may continue the determination process of step S2 in FIG. 7 as background even after the process subsequent to the character candidate detection (steps S3 to S7 in FIG. 7) is begun. In, this case, when the degradation evaluation value exceeds a threshold, the degradation evaluation module 102 may immediately stop outputting the first trigger, interrupt the process subsequent to the character candidate detection (steps S3 to S7) and proceed to step S8 for preview-displaying the obtained image as it is. By this configuration, when the user starts moving the data processor again to restart the framing, the refresh rate for preview display can be increased again in association with the move.

Figure 12:
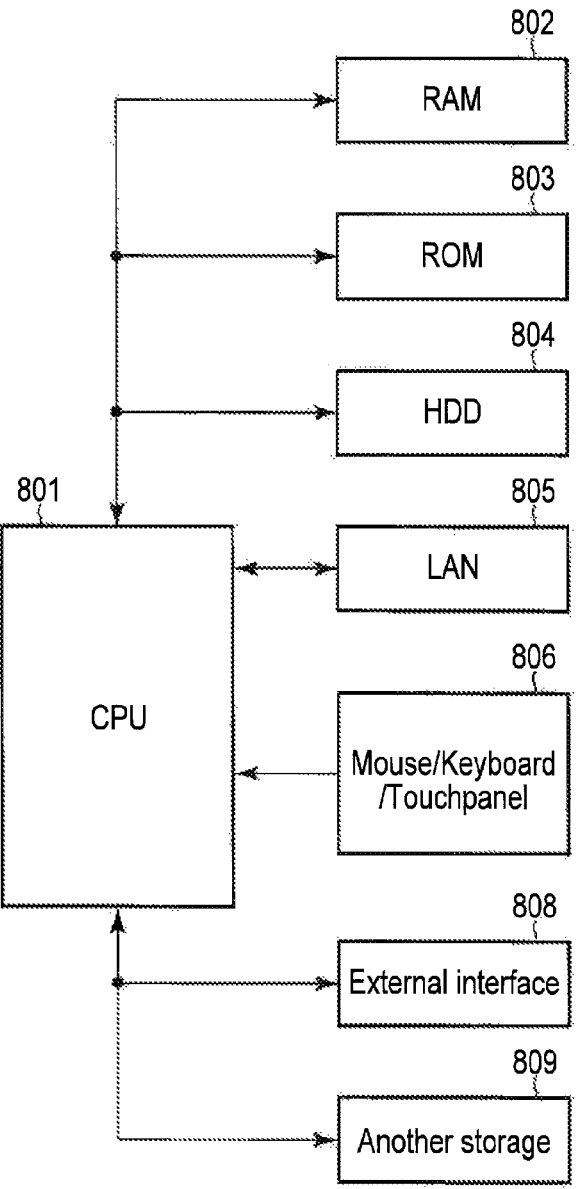
FIG. 12 is a function block diagram showing an example of the hardware configuration of the data processor according to the first embodiment.

With reference to FIG. 12, this specification explains an example of the hardware configuration of the data processor 10.

FIG. 12 shows the hardware configuration of the data processor. The data processor 10 of FIG. 12 includes a CPU 801, a RAM 802, a ROM 803, an HDD 804, a LAN 805, an input device 806, a display 807, an external interface 808, an external storage device 809, a camera 810 and an acceleration sensor 811.

The CPU 801 is a processor configured to control the components of the data processor 10. The CPU 801 executes a character row detection program loaded from the HDD 804 into the RAM 802. The CPU 801 is capable of functioning as a processor configured to perform the above data process by executing the character row detection program. The CPU 801 is also capable of loading a character row detection program from the external storage device 809 (for example, a USB device) into the RAM 802 and executing the program. In addition to the character row detection program, for example, an image used to perform a data process can be loaded from the external storage device 809.

The input device 806 is a keyboard, a mouse, a touch-panel, or another type of input device. The display 807 is a device configured to display the result of various processes performed by the data processor 10. The camera 810 is a device configured to capture an image that can be the target for a data process. The acceleration sensor 811 is a device configured to obtain the degradation evaluation value.

In the above first embodiment, only when the possibility that a character candidate is detected is high as a result of determination, the degradation evaluation module 102 outputs the first trigger for performing a character candidate detection process. Because of this degradation module 102, it is possible to maintain a high refresh rate and shorten the time required for framing as explained in FIG. 8. In this manner, the user can easily perform framing.

Second Embodiment

Figure 13:
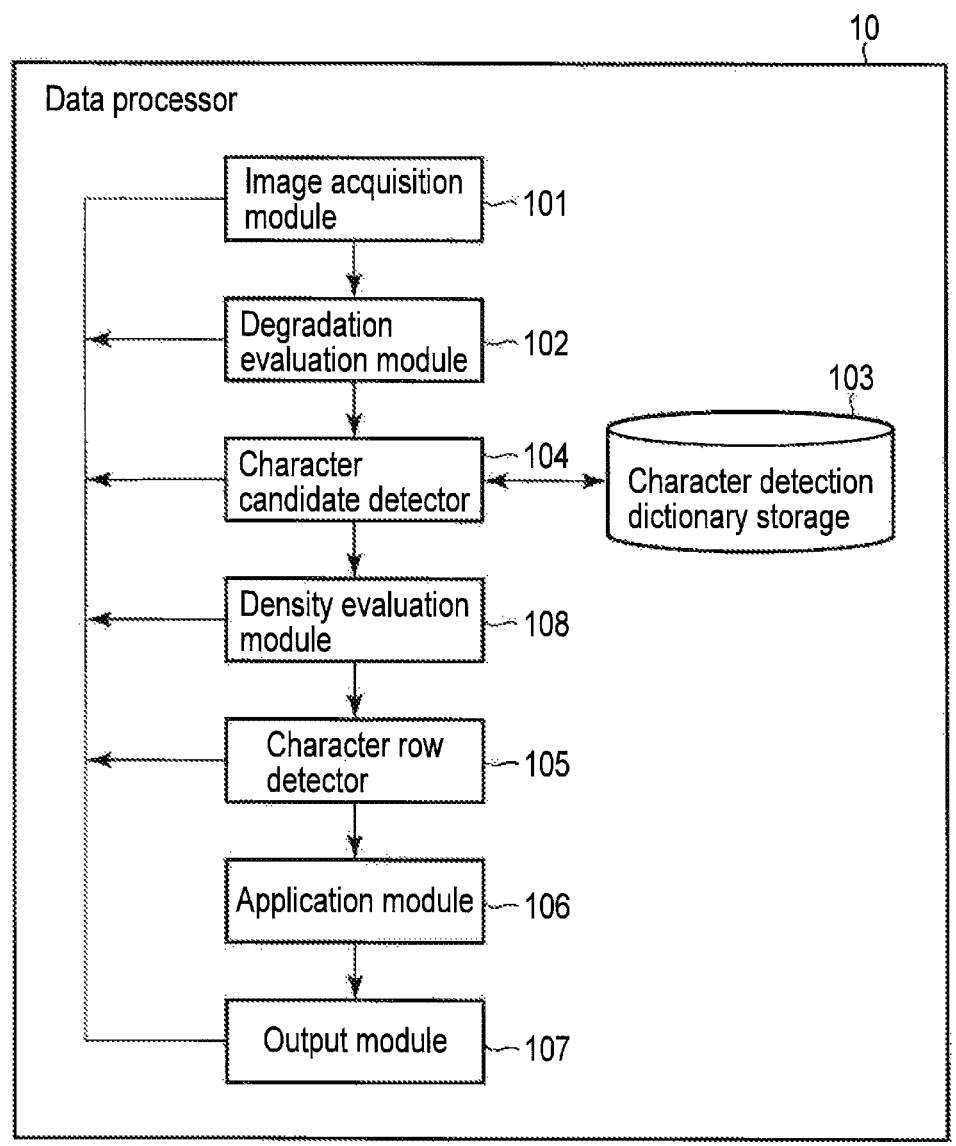
FIG. 13 is a function block diagram showing a configuration example of a data processor according to a second embodiment.

This specification explains a second embodiment with reference to FIG. 13. In the present embodiment, a data processor 10 further includes a density evaluation module 108 as shown in FIG. 13 in a manner different from that of the first embodiment. In the description below, the explanation of the same functions or configurations as those of the first embodiment is omitted. Functions or configurations different from those of the first embodiment are mainly explained below.

The density evaluation module 108 is a function module provided so as to stand between a character candidate detector 104 and a character row detector 105. After receiving the input of first detection result information output by the character candidate detector 104, the density evaluation module 108 performs a density evaluation process as explained later.

In general, characters are densely described so as to be aligned in one direction (for example, a lateral or vertical direction). Therefore, when character candidates are detected sparsely in the image by the character candidate detector 104, the possibility that a character row (character string) is detected from the image is low. When character candidates are detected densely in the image by the character candidate detector 104, the possibility that a character row (character string) is detected from the image is high.

The density evaluation module 108 performs a density evaluation process, using the above features. Specifically, the density evaluation module 108 calculates the character candidate area (hereinafter, referred to as the density evaluation value) per unit area by diving the sum of the areas occupied by (or the numbers of pixels of) a predetermined number of character candidates or more detected by the character candidate detector 104 by the area (the number of pixels) of the whole image. Based on the calculated density evaluation value, the density evaluation module 108 performs a density evaluation process for determining whether the possibility of detection of a character row is high or low. When the possibility of detection of a character row is high as a result of determination, the density evaluation module 108 outputs a second trigger for performing a character row detection process to the character row detector 105. When the possibility of detection of a character row is low as a result of determination, the density evaluation module 108 outputs a command for performing a preview display process to an output module 107.

Figure 14:
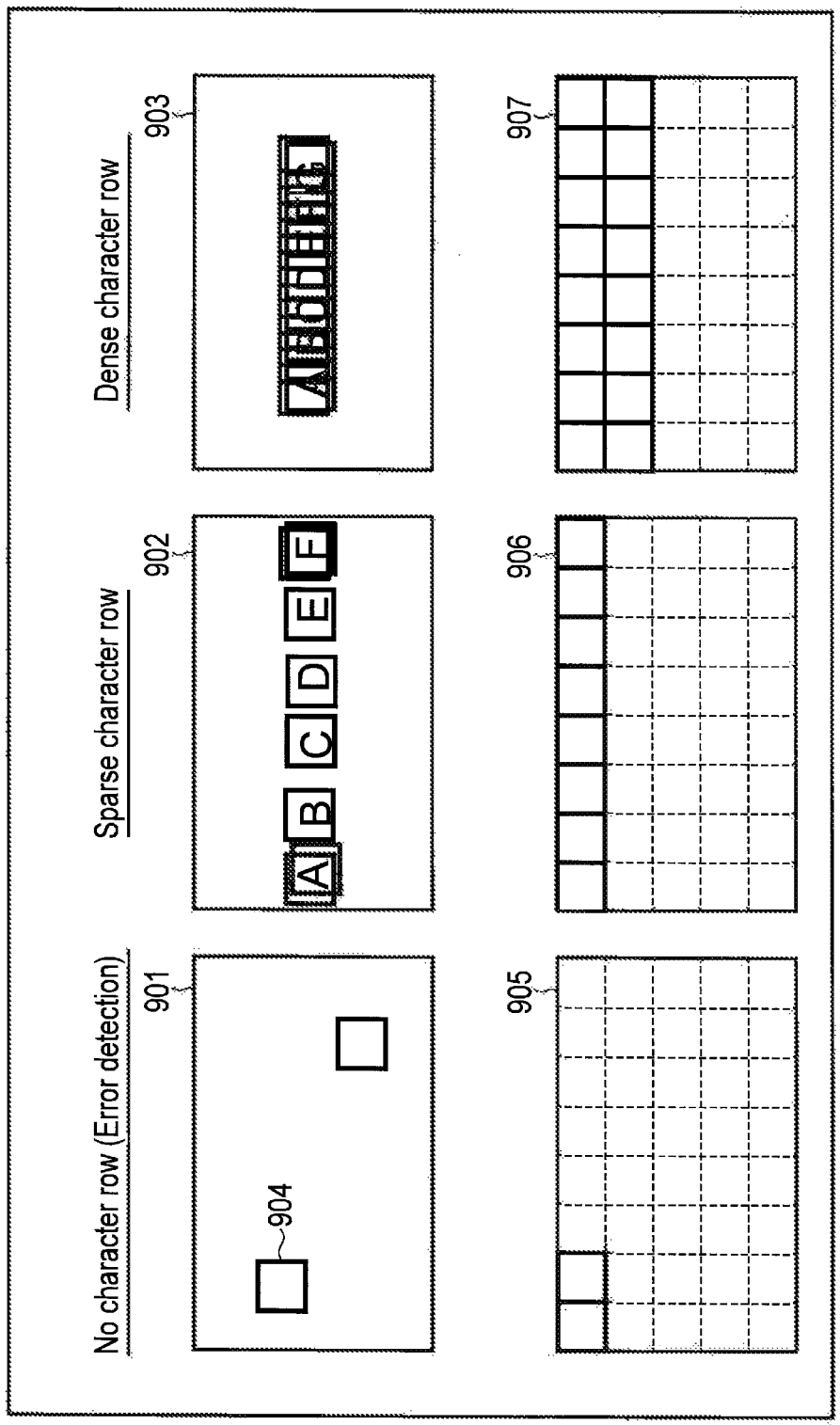
FIG. 14 is a pattern diagram shown for explaining the relationship between the distribution of character candidates and a density evaluation value.

Referring to FIG. 14, this specification more specifically explains the relationship between the distribution of character candidates detected by the character candidate detector 104 and the density evaluation value calculated by the density evaluation module 108. Here, even if the position of the actual characters is slightly different from the position of the detection window, the character candidate detector 104 is assumed to detect the detection window as a character candidate (in other words, to detect the area in which the detection window is located as an area in which a character is considered to be present). The character candidate detector 104 is assumed to detect each of detection windows for one character as a character candidate in a portion in which characters are densely described.

In FIG. 14, the number "901" exemplarily shows a case in which a character candidate is incorrectly detected from an image having no character. This case shows that the distribution of character candidates is discrete. In FIG. 14, the number "905" shows a diagram corresponding to the number "901". According to this diagram, the area of the whole image is forty times that of a detection window 904. Thus, the density evaluation value can be obtained as 0.05 (=2/40) by the above calculation method.

In FIG. 14, the number "902" exemplarily shows a case in which the character interval is wide; in other words, a plurality of character candidates are detected from the image in which the character row "ABCDEF" is sparsely described. This case shows that a plurality of (here, eight) character candidates are detected with a slightly high density around the character row "ABCDEF". In FIG. 14, the number "906" shows a diagram corresponding to the number "902". According to this diagram, the density evaluation value can be obtained as 0.2 (=8/40).

In FIG. 14, the number "903" exemplarily shows a case in which the character interval is narrow; in other words, a plurality of character candidates are detected from the image in which the character row "ABCDEFG" is densely described. This case shows that a plurality of (here, sixteen) character candidates are densely detected around the character row "ABCDEFG". In FIG. 14, the number "907" shows a diagram corresponding to the number "903". According to this diagram, the density evaluation value can be obtained as 0.4 (=16/40).

The relationship between the distribution of character candidates and the density evaluation value can be considered as follows. The more sparsely character candidates are distributed, the less the density evaluation value is. The more densely character candidates are distributed, the greater the density evaluation value is. In other words, the more sparsely character candidates are distributed, the more likely the density evaluation module 108 outputs a command for performing a preview display process to the output module 107. The more densely character candidates are distributed, the more likely the density evaluation module 108 outputs the second trigger for performing a character row detection process to the character row detector 105.

The sum of the areas of character candidates is increased by the area in which the candidates overlap with each other in comparison with the area which is actually covered by the candidates. As characters are described more densely, the sum of the areas of character candidates tends to be increased. This is because each of detection windows for one character is detected as a character candidate.

In place of the above density evaluation value, for example, it is possible to use, from the densities of character candidates in small areas of the image, the maximum value in the whole image as the density evaluation value. In this case, the density of character candidates is calculated for each small area. By obtaining the maximum value of the densities, it is possible to convert the situation in which character candidates are locally distributed at high density in the image into numbers.

When the size of the target character is limited to a narrow range, and the number of images of a resolution pyramid image 204 can be kept small, the difference in the size of detection windows may be ignored. Therefore, the ratio of the number of character candidates to a predetermined value (for example, a value obtained by dividing the average detection window area by the image area) may be obtained to obtain an approximate value of the density of character candidates.

Figure 15:
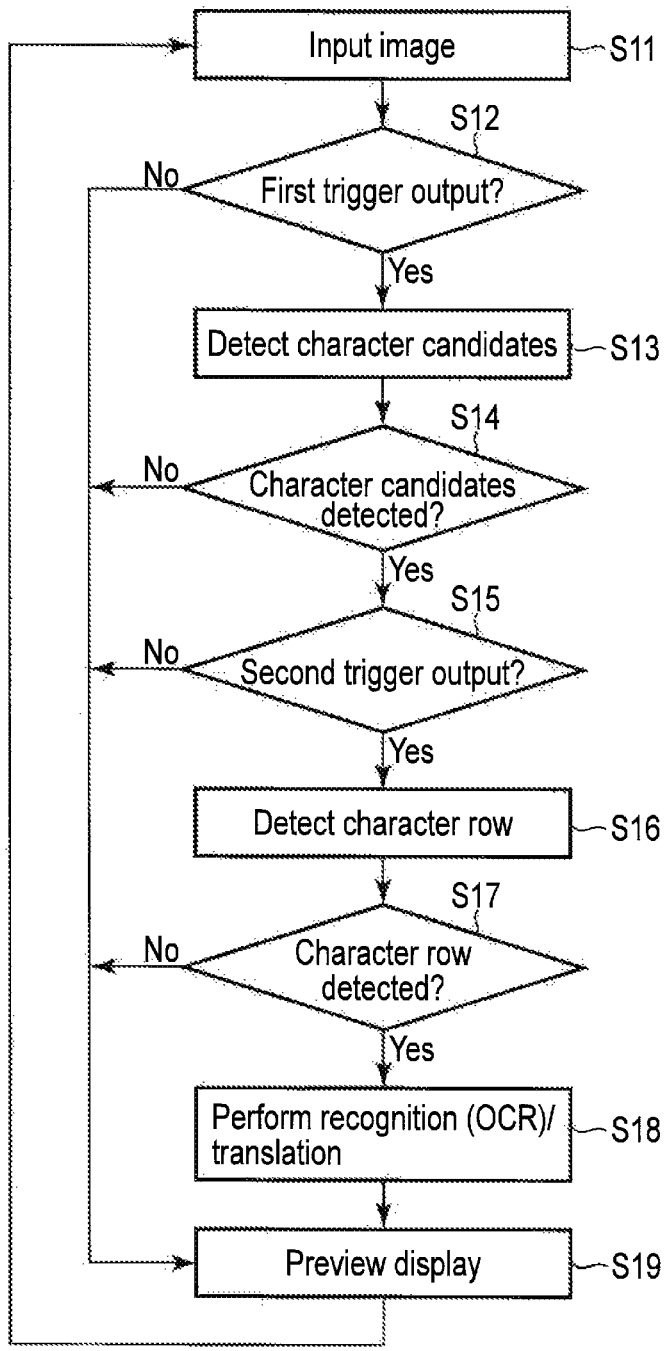
FIG. 15 is a flowchart showing an example of the operation of the data processor according to the second embodiment.

Now, this specification explains an example of the operation of the data processor 10 according to the second embodiment, referring to the flowchart of FIG. 15.

First, an image acquisition module 101 obtains an image captured by a camera function (step S11). Subsequently, a degradation evaluation module 102 obtains, from an acceleration sensor incorporated, into the data processor 10, etc., the degradation evaluation value at the time of capturing, the image obtained by the image acquisition module 101. The degradation evaluation module 102 determines whether or not the obtained degradation evaluation value is less than or equal to a predetermined threshold (step S12). When the degradation evaluation value exceeds the threshold as a result of the determination process in step S12 (NO in step S12), the process proceeds to step S19 for preview-displaying the obtained image as it is as described later.

When the degradation evaluation value is less than or equal to the threshold as a result of the determination process in step S12 (YES in step S12), the degradation evaluation module 102 outputs a first trigger for performing a character candidate detection process to the character candidate detector 104. After receiving the input of the first trigger output by the degradation evaluation module 102, the character candidate detector 104 applies a character candidate detection process to the image obtained by the image acquisition module 101 (step S13).

Subsequently, the character candidate detector 104 determines whether or not a predetermined number of character candidates or more are detected as a result of the character candidate detection process in step S13 (step S14). When a predetermined number of character candidates or more are not detected as a result of the determination, process in step S14 (NO in step S14), the process proceeds to step S19 for preview-displaying the obtained image as it is as described later.

When a predetermined number of character candidates or more are detected as a result of the determination process in step S14 (YES in step S14), the density evaluation module 108 calculates the density evaluation value based on the first detection result information obtained as a result of the character candidate detection process in step S13, and determines whether or not the calculated density evaluation value is greater than or equal to a predetermined threshold (step S15). When the density evaluation value is less than the threshold as a result of the determination process in, step S15 (NO in step S15), the process proceeds to step S19 for preview-displaying the obtained image as it is as described later.

When the density evaluation value is greater than or equal to the threshold as a result of the determination process in step S15 (YES in step S15), the density evaluation module 108 outputs the second trigger for performing a character row detection process to the character row detector 105. After receiving the input of the second trigger output by the density evaluation module 108, the character row detector 105 applies a character row detection process to the image obtained by the image acquisition module 101 (step S16).

Subsequently, the character row detector 105 determines whether or not one or more character rows are detected as a result of the character row detection process in step S16 (step S17). When no character row is detected as a result of the determination process in step S17 (NO in step S17), the process proceeds to step S19 for preview-displaying the obtained image as it is as described later.

When one or more character rows are detected as a result of the determination process in step S17 (YES in step S17), the character row detector 105 outputs second detection result information obtained as a result of the character row detection process in step S16 to an application module 106. The application module, 106 performs a process (for example, a character recognition process or a translation process) unique to an application installed in advance based on the second detection result information output by the character row detector 105, and outputs the process result information showing the process result to the output module 107 (step S18).

After receiving the input of the process result information output by the application module 106, the output module 107 performs a preview display process for superimposing the process result information on the image obtained by the image acquisition module 101 and displaying the image on the display. When the input of a command for performing a preview display process is received from each module different from the application module 106, the output module 107 at least displays the image obtained by the image acquisition module 101 on the display as it is (step S19) and terminates the process.

Now, this specification explains differences between the conventional data processing method, the data processing method of the first embodiment and the data processing method of the present embodiment, referring to FIG. 16. Mainly, this specification explains differences in terms of a framing period and a refresh rate.

FIG. 16(a) and FIG. 16(b) are the same as FIG. 8(a) and FIG. 8(b) described above, respectively. Thus, the detailed explanation of the figures is omitted.

FIG. 16(c) is a pattern diagram showing the relationship between the process executed until the acquisition of a desired result and the time required for the process when the mechanism configured to output the first trigger and the mechanism configured to output the second trigger are provided. In this case, the first trigger for performing a character candidate detection process is not output at least in the whole large-move period in a matter similar to that of FIG. 16(b). Thus, it is possible to maintain a high refresh rate in the whole large-move period in comparison with the conventional method. In FIG. 16(a) and FIG. 16(b), a character row detection process is performed at least in the second half of the fine-adjustment period even if character candidates sparsely arranged are detected by a character candidate detection process. Thus, the refresh rate is low.

However, in FIG. 16(c), the mechanism configured to output the second trigger is provided. Therefore, even if character candidates sparsely arranged, are detected by a character candidate detection process, the second trigger is not output; in other words, a character row detection, process is not performed. In, this manner, the refresh rate can, be increased by this amount in comparison with FIG. 16(a) and FIG. 16(b). The time required to obtain a desired result can be reduced to time $T_3$, as shown in FIG. 16(c).

With reference to FIG. 17, this specification explains a graph icon for suggesting the degradation evaluation value.

FIG. 17 is a pattern diagram showing an example of a graph icon for suggesting the density evaluation value. The graph (here, the bar graph) showing the density evaluation value is displayed in a graph display area 1001 on the display of the data processor 10 by the output module 107. Here, the graph display area 701 shown in FIG. 11 explained above and, the graph display area 1001 shown in FIG. 17 are assumed to be provided in different positions. In this manner, the user can visually recognize both the degradation evaluation value and the density evaluation value. FIG. 17 shows a graph 1002 indicating the density evaluation value calculated by the density evaluation module 108. FIG. 17 also shows a line 1003 indicating a predetermined threshold in the density evaluation module 108. According to FIG. 17, the user can visually recognize that the density evaluation value calculated by the density evaluation module 108 is greater than the predetermined threshold (in other words, the second trigger is output). When the density evaluation value is greater than the predetermined threshold (in other words, the second trigger is output), the user can more easily recognize that the second trigger is output by differentiating the color or brightness of the graph from that of the graph which is displayed when the density evaluation value is less than the threshold.

As shown in FIG. 17, in addition to the degradation evaluation value, the user is notified of the density evaluation value. This notification enables the user to more specifically predict, when a desired result is not obtained from detection, recognition or translation of a character row, the cause of this failure. For example, the user can predict that the cause is the large-move period, or the failure of detection of a character candidate because the target character is too far or the inclination of the character is too steep. Further, the user can predict that the cause is the insufficient density of the detected character candidates, or the failure of detection of a character row even if the density of the detected character candidates is sufficient.

In the above second embodiment, the density evaluation module 108 is further provided. The density evaluation module 108 outputs the second trigger for performing a character row detection process only when the possibility that a character row is detected is high as a result of determination. Therefore, it is possible to maintain a high refresh rate and further shorten the time required for framing as explained in FIG. 16 in comparison with the first embodiment.

Third Embodiment

This specification explains a third embodiment with reference to the flowchart of FIG. 18. In the present embodiment, in a manner different from that of the first or second embodiment, a character candidate detector 104 does not perform a character candidate detection process immediately after receiving the input of a first trigger. Instead, the character candidate detector 104 performs a character candidate detection process if the input of the first trigger output by a degradation evaluation module 102 is still received after the elapse of a certain period (for example, approximately 0.5 seconds) from the receipt of the input of the first trigger.

As described above, a character candidate detection process is performed if the input of the first trigger has been continuously received for a certain period (in other words, a character candidate detection process is performed with the introduction of a delay frame). In this manner, even if an action of revoking the input of the first trigger is performed (for example, a data processor 10 is moved in a large scale) immediately after the first trigger is output by the degradation evaluation module 102, a character candidate detection process is not performed redundantly.

This specification explains an example of the operation of the data processor 10 according to the third embodiment, referring to the flowchart of FIG. 18.

First, an image acquisition module 101 obtains an Image captured by a camera function (step S21). Subsequently, the degradation, evaluation module 102 obtains, from an acceleration sensor incorporated into the data processor 10, the degradation evaluation value at the time of capturing the image obtained by the image acquisition module 101. The degradation evaluation module 102 determines whether or not the obtained degradation evaluation value is less than or equal to a predetermined threshold (step S22). When, the degradation, evaluation value exceeds the threshold as a result of the determination process in step S22 (NO in step S22), the process proceeds to step S30 for preview-displaying the obtained image as it is as described later.

When the degradation evaluation value is less than or equal to the threshold as a result of the determination process in step S22 (YES in step S22), the degradation evaluation module 102 outputs the first trigger for performing a character candidate detection process to the character candidate detector 104. After receiving the input of the first trigger output by the degradation evaluation module 102, the character candidate detector 104 determines whether or not the input of the first trigger has been continuously received for a certain period (step S23). If the input of the first trigger has not been continuously received for a certain period as a result of the determination process in step S23 (NO in step S23), the process proceeds to step S30 for preview-displaying the obtained image as it is as described later.

If the input of the first trigger output by the degradation evaluation module 102 has been continuously received for a certain period as a result of the determination process in step S23 (YES in step S23), the character candidate detector 104 applies a character candidate detection process to the image obtained by the image acquisition module 101 (step S24).

Subsequently, the character candidate detector 104 determines whether or not a predetermined number of character candidates or more are detected as a result of the character candidate detection process in step S24 (step S25). When a predetermined number of character candidates or more are not detected as a result of the determination process in step S25 (NO in step S25), the process proceeds to step S30 for preview-displaying the obtained image as it is as described later.

When a predetermined number of character candidates or more are detected as a result of the determination process in step S25 (YES in step S25), a density evaluation module 108 calculates the density evaluation value based on first detection result information obtained as a result of the character candidate detection, process in step S24, and determines whether or not the calculated density evaluation value is greater than or equal to a predetermined threshold (step S26). When the density evaluation value is less than the threshold as a result of the determination process in step S26 (NO in step S26), the process proceeds to step S30 for preview-displaying the obtained image as it is as described later.

When the density evaluation value is greater than or equal to the threshold as a result of the determination process in step S26 (YES in step S26), the density evaluation module 108 outputs a second trigger for performing a character row detection process to a character row detector 105. After receiving the input of the second trigger output by the density evaluation module 108, the character row detector 105 applies a character row detection process to the image obtained by the image acquisition module 101 (step S27).

Subsequently, the character row detector 105 determines whether or not one or more character rows are detected as a result of the character row detection process in step S27 (step S28). When no character row is detected as a result of the determination process in step S28 (NO in step S28), the process proceeds to step S30 for preview-displaying the obtained image as it is as described later.

When one or more character rows are detected as a result of the determination process in step S28 (YES in step S28), the character row detector 105 outputs second detection result information obtained as a result of the character row detection process in step S27 to an application module 106. The application module 106 performs a process (for example, a character recognition process or a translation process) unique to an application installed in advance based on the second detection result information output by the character row detector 105, and outputs the process result information showing the process result to an output module 107 (step S29).

After receiving the input of the process result information output by the application module 106, the output module 107 performs a preview display process for superimposing the process result information on the image obtained by the image acquisition module 101 and displaying the image on the display. When the input of a command for performing a preview display process is received from each module different from the application module 106, the output module 107 at least displays the image obtained by the image acquisition module 101 on the display as it is (step S30) and terminates the process.

Now, this specification explains differences between the conventional data processing method, the data processing method of the first embodiment, the data processing method of the second embodiment and the data processing method of the present embodiment. Mainly, this specification explains differences in terms of a framing period and a refresh rate.

FIG. 19(a) to FIG. 19(c) are the same as FIG. 16(a) to FIG. 16(c) described above, respectively. Thus, the detailed explanation of the figures is omitted.

FIG. 19(d) is a pattern diagram showing the relationship between the process executed until the acquisition of a desired result and the time required for the process when the mechanism configured to output the first trigger, the mechanism configured to output the second trigger and the delay frame are provided. In this case, it is possible to maintain a high refresh rate in the whole large-move period and the second half of the fine-adjustment period in a manner similar to that of FIG. 19(c). In FIG. 19(b) and FIG. 19(c), a character candidate detection process is performed immediately after the output of the first trigger at least in the first half of the fine-adjustment period. Therefore, if an action of revoking the output of the first trigger is made, this action cannot be appropriately dealt with. However, in FIG. 19(d), a delay frame is introduced, and thus, a character candidate detection process is not performed when an action of revoking the output of the first trigger is made. In this manner, the refresh rate can be kept high by this amount in comparison with FIG. 19(b) and FIG. 19(c). The time required to obtain a desired result can be reduced to time $T_4$, as shown in FIG. 19(d).

In the above third embodiment, the delay frame is introduced into the character candidate detector 104 to deal with an action of revoking the input of the first trigger. Thus, it is possible to maintain a high refresh rate and further shorten the time required for framing as explained in FIG. 19 in comparison with the first and, second embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processor comprising:
a degradation evaluation module implemented by one or more hardware processors and configured to evaluate whether a possibility that an image area which corresponds to a character is detected from an image is high based on a degree of degradation of the image;
a character row detection module implemented by one or more hardware processors and configured to perform a process for detecting the image area when the possibility is high as a result of evaluation by the degradation evaluation module; and
an output module configured to display the image without performing the process when the possibility is low as a result of the evaluation.

2. The data processor of claim 1, further comprising:
a density evaluation module configured to evaluate whether a possibility that a character row is detected from the image is high based on a density evaluation value indicating to what extent the detected predetermined number of image areas or more occupy a total area of the image, wherein
the character row detection module performs the process for detecting the character row when the possibility is high as a result of evaluation by the density evaluation module, and
the output module displays the image without performing the process when the possibility is low as a result of the evaluation by the density evaluation module.

3. The data processor of claim 1, wherein
the image areas which corresponds to characters are detected from the image when the process is continuously performed for a certain period.

4. The data processor of claim 1, further comprising a display configured to display the image.

5. The data processor of claim 1, wherein
the degradation evaluation module evaluates whether the degree of degradation of the image is less than or equal to a predetermined threshold, using a pose change amount which is measured at the time of capturing the image as the degree of degradation of the image, and
the character row detection module performs the process when the degree of degradation of the image is less than or equal to the threshold as a result of evaluation by the degradation evaluation module.

6. The data processor of claim 5, wherein
the character row detection module performs the process when the degree of degradation of the image is less than or equal to the threshold as a result of the evaluation by the degradation evaluation module, and further, when an imaging unit configured to capture the image comes into focus.

7. A data processing method comprising:
evaluating whether a possibility that an image area which corresponds to a character is detected from an image is high based on a degree of degradation of the image;
performing a process for detecting the image area when the possibility is high as a result of evaluation; and
displaying the image without performing the process when the possibility is low as a result of the evaluation.

8. The data processing method of claim 7, further comprising:
evaluating whether a possibility that a character row is detected from the image is high based on a density evaluation value indicating to what extent the detected predetermined number of image areas or more occupy a total area of the image, wherein
the performing includes performing the process for detecting the character row when the possibility is high as a result of evaluation, and
the displaying includes displaying the image without performing the process when the possibility is low as a result of the evaluation.

9. The data processing method of claim 7, wherein
the image areas which corresponds to characters are detected from the image when the process is continuously performed for a certain period.

10. The data processing method of claim 7, wherein
the evaluating includes evaluating whether the degree of degradation of the image is less than or equal to a predetermined threshold, using a pose change amount which is measured at the time of capturing the image as the degradation evaluation value, and
the performing includes performing the process when the degree of degradation of the image is less than or equal to the threshold as a result of evaluation.

11. The data processing method of claim 10, wherein
the performing includes performing the process when the degree of degradation of the image is less than or equal to the threshold, and further, when an imaging unit configured to capture the image comes into focus.

12. A non-transitory computer-readable storage medium storing instructions executed by a computer, wherein the instructions, when executed by the computer, cause the computer to perform:
evaluating whether a possibility that an image area which corresponds to a character is detected from an image is high based on a degree of degradation of the image;
performing a process for detecting the image area when the possibility is high as a result of evaluation; and
displaying the image without performing the process when the possibility is low as a result of the evaluation.

13. The storage medium of claim 12, further cause the computer to perform:
evaluating whether a possibility that a character row is detected from the image is high based on a density evaluation value indicating to what extent the detected predetermined number of image areas or more occupy a total area of the image, wherein
the performing includes performing the process for detecting the character row when the possibility is high as a result of evaluation, and
the displaying includes displaying the image without performing the process when the possibility is low as a result of the evaluation.

14. The storage medium of claim 12, wherein
the image areas which corresponds to characters are detected from the image when the process is continuously performed for a certain period.

15. The storage medium of claim 12, wherein
the evaluating includes evaluating whether the degree of degradation of the image is less than or equal to a predetermined threshold, using a pose change amount which is measured at the time of capturing the image as the degradation evaluation value of the image, and
the performing includes performing the process when the degree of degradation of the image is less than or equal to the threshold as a result of evaluation.

16. The storage medium of claim 15, wherein
the performing includes performing the process when the degree of degradation of the image is less than or equal to the threshold, and further, when an imaging unit configured to capture the image comes into focus.

* * * * *